US012724764B2

(12) United States Patent
Gleitman et al.

(10) Patent No.: US 12,724,764 B2
(45) Date of Patent: Sep. 1, 2026

(54) SUPPLY CHAIN QUALITY ASSURANCE FOR WELL COMPLETION USING BLOCKCHAIN

(71) Applicant: Halliburton Energy Services, Inc., Houston, TX (US)

(72) Inventors: Daniel D. Gleitman, Houston, TX (US); Ron Dusterhoft, Waurika, OK (US); Behrouz Ebrahimi, Katy, TX (US); Nicole Mast, Houston, TX (US); Philip D. Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 352 days.

(21) Appl. No.: 18/367,922

(22) Filed: Sep. 13, 2023

(65) Prior Publication Data

US 2024/0086398 A1 Mar. 14, 2024

Related U.S. Application Data

(60) Provisional application No. 63/406,107, filed on Sep. 13, 2022.

(51) Int. Cl.
*G06F 16/23* (2019.01)
*E21B 43/26* (2006.01)
(Continued)

(52) U.S. Cl.
CPC ...... *G06F 16/2379* (2019.01); *E21B 43/2607* (2020.05); *G05B 13/042* (2013.01); *G06Q 50/02* (2013.01)

(58) Field of Classification Search
CPC ...... G06F 16/23; G06F 16/2379; E21B 43/26; E21B 43/2607; G05B 13/042; G06Q 50/02
See application file for complete search history.

(56) References Cited

U.S. PATENT DOCUMENTS

| | | |
|---|---|---|
| 7,516,788 B2 | 4/2009 | Gleitman et al. |
| 9,552,406 B2 | 1/2017 | Olsen et al. |

(Continued)

FOREIGN PATENT DOCUMENTS

| | | |
|---|---|---|
| WO | 2008147897 A1 | 12/2008 |
| WO | 2017004476 A1 | 1/2017 |

(Continued)

OTHER PUBLICATIONS

"OT and Blockchain for Smart Water Quality Management in Future Cities: A Hyperledger Fabric Framework for Smart Water Quality Management and Distribution", Dec. 12, 2023 (Year: 2013).*

(Continued)

*Primary Examiner* — Maher N Algibhah
(74) *Attorney, Agent, or Firm* — NOVAK DRUCE CARROLL LLP

(57) ABSTRACT

Systems, methods, and computer-readable media are provided for performing a well completion. Specifically, a distributed ledger associated with a supply chain for a well completion is accessed. The distributed ledger can include a first entry associated with a first entity in the supply chain that is indicative of an identification of the first entity and characteristics of a material implemented in the well completion. The ledger can also include a second entry associated with a second entity in the supply chain that is indicative of the second entity and the characteristics of the material at the second entity. Integration of the material in the well completion can be controlled based on the first entry and the second entry.

21 Claims, 10 Drawing Sheets

(51) Int. Cl.
*G05B 13/04* (2006.01)
*G06Q 50/02* (2012.01)

(56) References Cited

U.S. PATENT DOCUMENTS

| | | | | |
|---|---|---|---|---|
| 11,416,276 | B2 | 8/2022 | Siegmund | |
| 11,551,106 | B2 | 1/2023 | Maucec | |
| 11,582,042 | B2 | 2/2023 | Beckmann et al. | |
| 2020/0162260 | A1* | 5/2020 | Boneti | H04L 67/10 |
| 2021/0042633 | A1 | 2/2021 | Maucec | |
| 2021/0182773 | A1 | 6/2021 | Padmanabhan | |
| 2021/0224727 | A1 | 7/2021 | Rakhunde et al. | |
| 2022/0164455 | A1* | 5/2022 | Jeanson | H04L 67/025 |
| 2022/0207059 | A1 | 6/2022 | Wang et al. | |
| 2022/0365511 | A1 | 11/2022 | Flores Perez et al. | |

FOREIGN PATENT DOCUMENTS

| | | | |
|---|---|---|---|
| WO | 2019070256 | A1 | 4/2019 |
| WO | 2022240689 | A1 | 11/2022 |
| WO | 2022241459 | A1 | 11/2022 |
| WO | 2023099976 | A1 | 6/2023 |

OTHER PUBLICATIONS

Abstract of Andoni, Merlinda et al., "Blockchain technology in the energy sector: A systematic review of challenges and opportunities", Renewable and Sustainable Energy Reviews, vol. 100, 2019, pp. 143-174; Feb. 2019.

Abstract of Sickmann, Z.T et al., "Fingerprinting construction sand supply-networks for traceable sourcing"; Aug. 2022.

Abstract of Vera, Fabian, "Unlocking Oilfield Development using Blockchain", Paper presented at the SPE Latin American and Caribbean Petroleum Engineering Conference, Virtual, Jul. 2020; Paper No. SPE-199170-MS.

Abstract of Dorfman, Brian et al., "Can Wet Sand be Used for more than Building Sand Castles on the Beach?", Paper presented at the SPE Canada Unconventional Resources Conference, Virtual, Sep. 2020; Paper No. SPE-199975-MS.

Abstract of Batra, Mayur et al., "Supply Chain Powered by AI and Blockchain", Paper presented at the Abu Dhabi International Petroleum Exhibition & Conference, Abu Dhabi, UAE, Nov. 2020; Paper No. SPE-203331-MS.

* cited by examiner

SUPPLY CHAIN QUALITY ASSURANCE FOR WELL COMPLETION USING BLOCKCHAIN

CROSS REFERENCE TO RELATED APPLICATIONS

This application claims benefit to U.S. Application No. 63/406,107, filed Sep. 13, 2022, which is incorporated by reference in its entirety.

TECHNICAL FIELD

The present technology pertains to well completions, and in particular, to the use of a distributed ledger to track materials used in a well completion.

BACKGROUND

Hydrocarbon production is a highly complex process, with thousands of interactions between humans, hardware, software, and raw material inputs occurring daily. Successful production involves the orchestrated interaction of many interrelated activities and entities and requires complex steps for combining various labor and material inputs to successfully drill, complete, and manage hydrocarbon production. Supply chains that support such undertakings can be equally complex and so it can be difficult to control the quality of variously supplied products, such as raw materials.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Figure 1:
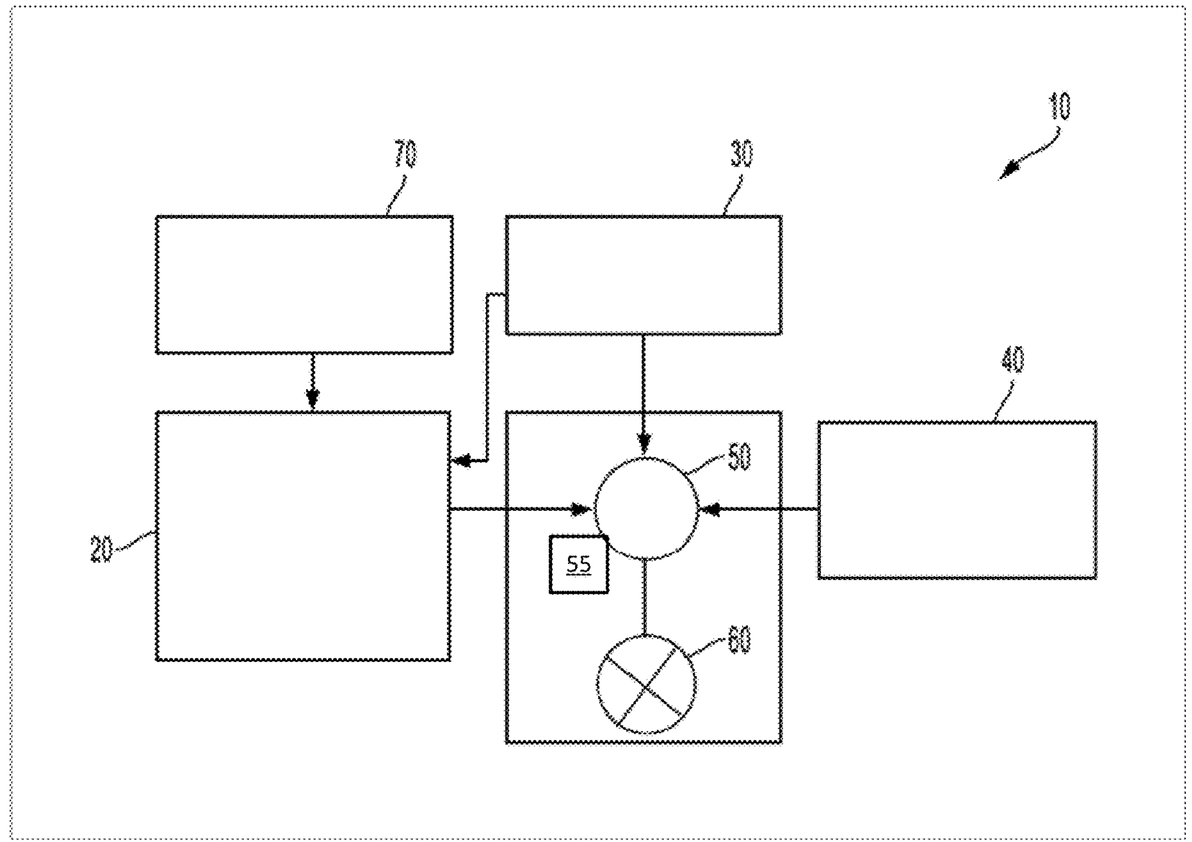
FIG. 1 is a schematic diagram of an example fracturing system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. These veins or planes may be highly complex and include a multitude of branching channels or microfractures, and a fracture as referenced herein may comprise a primary plane or vein and/or a complex set of connected channels. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation may be made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the hold-up of the well, the amount of fluid that fills the fracture, and the amount of fluid that leaks off into the formation, the formation matrix, microfractures, natural fractures, failed or otherwise sheared fractures, and/or bedding planes during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled with a sufficient quantity of proppant to stabilize the fractures.

This process can be repeated in a plurality of fracturing stages to form a plurality of fractures through a wellbore, e.g. as part of a well completion phase. In particular, this process can be repeatedly performed through a plug-and-perf technique to form the fractures throughout a subterranean formation. These stages may be at particular measured depths of the wellbore corresponding to a series of intended production or formation target zones along the length of the wellbore. Stages may correspond to a length along the wellbore that is to be exposed to the hydraulic fracturing pressure. Within each stage, multiple clusters of perforations, spaced equally or non-equally along the length of the stage, can be formed. After the fractures are formed, resources, e.g., hydrocarbons, can be extracted from the fractures during a well production phase.

Various providers and end-customers (collectively, "participants") typically participate in a services supply chain that manages hydraulic fracturing-based operations. The providers may be responsible for supplying material inputs (e.g., sand, or water), and/or contributing specialized labor, such as by providing pumping or monitoring services. However, due to a lack of information sharing, and therefore a lack of trust amongst participants it is difficult to organize providers around unified value attribution models. Therefore, it is difficult to measure individual contributions to a value objective. As a result, reliable recognition processes do not currently exist for accurately compensating (and thereby incentivizing) providers at any given level of the value chain. A better understanding of how provider contributions affect supply chain mechanics is of greatest concern to end-chain participants, i.e., "operators" who are often the major or independent oil and gas companies or other entities with ownership interest in the hydrocarbon production, and ultimate responsibility for its production from the producing assets or "oilfields", and who typically contract at least the first tier product and service providers for the major contributions to enabling such production. A participant can include an oilfield services company that performs a well completion for an operator that is at the top of a supply chain.

Aspects of the subject disclosure provide solutions for collecting information at various points in a supply chain and for sharing the collected information between supply chain participants, e.g., service providers and operators. As a result, aspects of the disclosure contemplate solutions for enabling provider markets that are updated and maintained in real-time, or near real-time, based on provider value contributions.

In some aspects, supply chain data may be shared between participants through storage to a distributed ledger or database, such as a blockchain or a directed acyclic graph (DAG) based ledger, such as using the IOTA tangle. In such approaches, select entities in the supply chain ecosystem may have the ability to write supply chain data to the distributed ledger (e.g., the blockchain), and to append/augment existing data with new or subsequent information. By way of example, block creation on the blockchain may be restricted to certain types of participants that have been approved to validate actions by participants in the supply chain. As discussed in further detail below, participation may also be predicated on the use of specialized machinery, sensors, and/or other hardware, for example, that conform to standards or protocols mutually agreed upon by various supply chain participants, e.g., sand vendors, pumping services companies, well completion providers, and other applicable oilfield service companies.

As discussed herein, a blockchain can be any type of shared database ledger with multiple participants (nodes) comprised of various participants in a particular supply/value chain or ecosystem. By way of example, the participants may be different corporate entities, such as providers that compete at various levels of an oilfield services supply chain. In the example of hydraulic fracturing-based production operations, the entities may include sand providers, water providers, chemical providers, pumping services companies, monitoring service companies, oil and gas operating companies, and the like.

The blockchain can be used to share certain types of supply chain data amongst the participants/nodes and produce performance and value provision metrics per algorithms agreed upon by the participants, for example, to attribute value contributions more accurately to individual participants. Depending on the desired implementation, value contributions may be measured according to different metrics, e.g., initial production, total production, and/or a Net Present Value (NPV) of overall production, etc., and/or based on furtherance of the goal(s) of intermediate level participants in the value/supply chain.

In some aspects, a shared registry (e.g. a blockchain) can be coded into a database structure and distributed across multiple participants who are all at one or another level, preferably at least two competing participants at each level, of the value chain. The registry is encrypted, with certain permissions by participants as described below. The registry is configured for daily or more frequent update to reflect new entries by each participant in their respective instances of the database.

The registry can be (or can include) a multi-dimensional matrix that is configured to represent various dimensions involved in measuring and attributing value contributions in the overall ecosystem to which the registry pertains and the participants each participate in the operations—for example, a major oil and gas basin such as the Permian Basin, with its various top-level participants and supply chain participants. These dimensions may include: Operations Locations (e.g. counties, well pads), time units (e.g. days), and/or participants at each level of the chain (e.g. Operators, Service Co's, Sand Providers).

The registry can further include (and is updated to include) "Blocks" of data entries to further characterize the relevant value-creation activities for each unique location/day/set of participants, data characterizing the contribution to the value created. The Blocks include certain data that are "Fixed" and relate more broadly to e.g., the location and participant, such as physical characteristics (e.g. depth and length) and certain pre-determined operational circumstances (e.g., operational requirements set by the operator or another participant, such as number of Frack stages per well), with which an algorithm can be used to normalize the performance or output data from block to block and that otherwise makes comparisons and value attribution difficult. Additionally, blocks can include metadata describing operational inputs (and potentially performance data) of the various participants.

In a services scenario such as fracturing a series of wells, the shared registry can be set up with a standard format (e.g., an agreed single prompt screen) for participants to periodically enter data to begin to populate these Blocks, e.g., "Daily Reports" of respective activities as are known today. Participants may all agree on standards for expressing as data entries their operational contributions, simplistic examples being hydraulic horsepower (HHP), pounds of sand, sand quality, water characteristics, chemical characteristics, chemical quantities, etc., (as well as for Fixed data and output results).

In some aspects, supply chain information may be automatically collected at various points throughout the supply chain and may be used to describe various attributes of raw materials or services tasks that are being performed.

Turning now to FIG. 1, an example fracturing system 10 is shown. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing treatment, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing treatment instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a viscous fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing treatment. The one or more solids within the solid source 40 can include applicable solids that can be added to the fracturing fluid of the fluid source 30. Specifically, the solid source 40 can contain one or more proppants for stabilizing fractures after they are formed during a fracturing treatment, e.g. after the fracturing fluid flows out of the formed fractures. For example, the solid source 40 can contain sand.

The fracturing system 10 can also include additive source 70. The additive source 70 can contain/provide one or more applicable chemicals, mixtures, or other additives that can be mixed into fluid, e.g. the fracturing fluid, during a fracturing treatment. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing treatment. The additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracturing treatment. The pump and blender system 50 can include one or more pumps. Specifically, the pump and blender system 50 can include a plurality of pumps that operate together, e.g. concurrently, to form fractures in a subterranean formation as part of a fracturing treatment. The one or more pumps included in the pump and blender system 50 can be an applicable type of fluid pump. For example, the pumps in the pump and blender system 50 can include electrically driven pumps diesel driven pumps, and/or gas powered pumps. Electric motors, diesel, gas fired motors, motors fueled in part by hydrogen, duel fuel motors, or a combination thereof may be integrated with or coupled to respective pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 can be equipped with one or more monitoring devices, e.g. monitoring device 55. The monitoring devices can be used to monitor characteristics of the pumps, the motors driving the pumps, or pumping process, the blenders, as well as the fluids and solids being mixed or pumped. In turn, the monitored characteristics can be used, e.g. by actuators such as valves, pump on/off, and speed controls, to control the flow of fluids, solids, and/or other compositions to the pumping and blender system 50. Such monitoring devices and/or actuators can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Monitoring devices can include sensors may be integrated into the frack pumps and the associated equipment in order to identify and/or characterize proppant or anomalies in regard to particular components. Such sensors may be used for health monitoring of particular components, and to identify and/or characterize conditions which may represent a gradual wear or damage process, or incipient or actual failure. Such sensors can include applicable sensors for generating data that can be used in characterizing proppant and anomalies in regard to particular components used in the well completion. For example, strain gauges, accelerometers, temperature sensors, and other sensors may installed on the pistons, the check valves, valve seats, and on the pump fluid end conduits.

Figure 2:
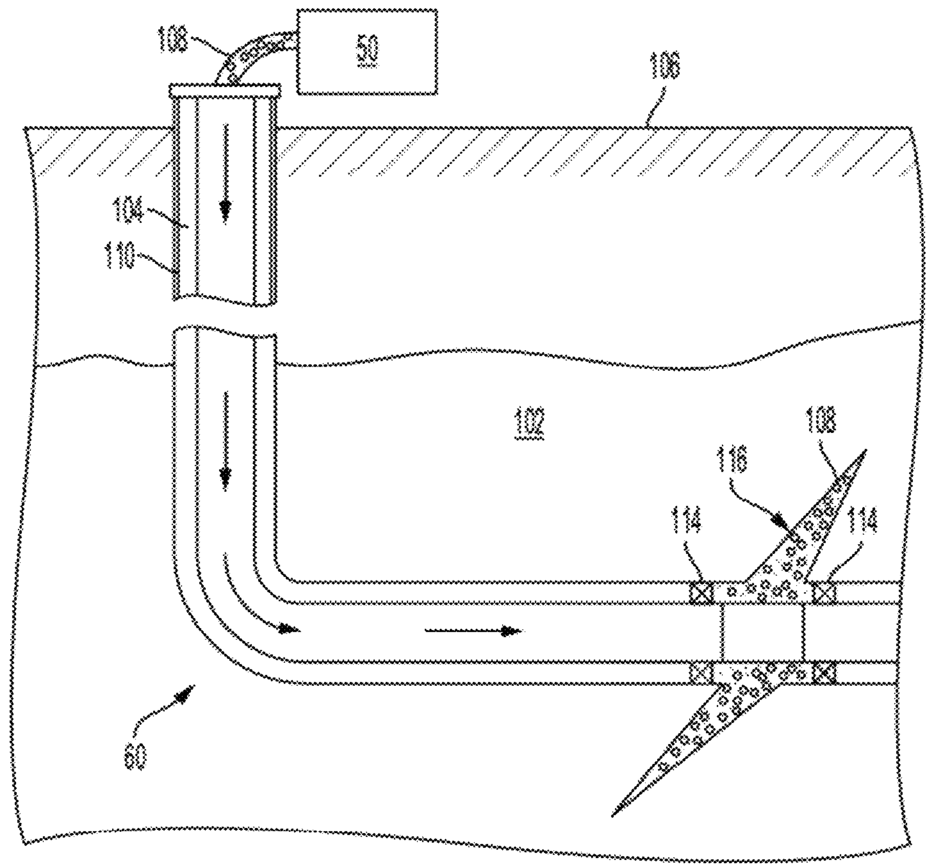
FIG. 2 illustrates a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 can include horizontal, vertical, slant, curved, and other types of wellbore geometries and orientations, and the fracturing treatment can be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. Perforations can be formed in the casing 110 using perforating guns with an applicable wireline conveyed, or wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, greater than two perforations can be formed in the wellbore 104, e.g. along the top side of the wellbore 104, as part of a perforation cluster. Further, multiple perforation clusters can be included in or otherwise formed during a single fracturing stage. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
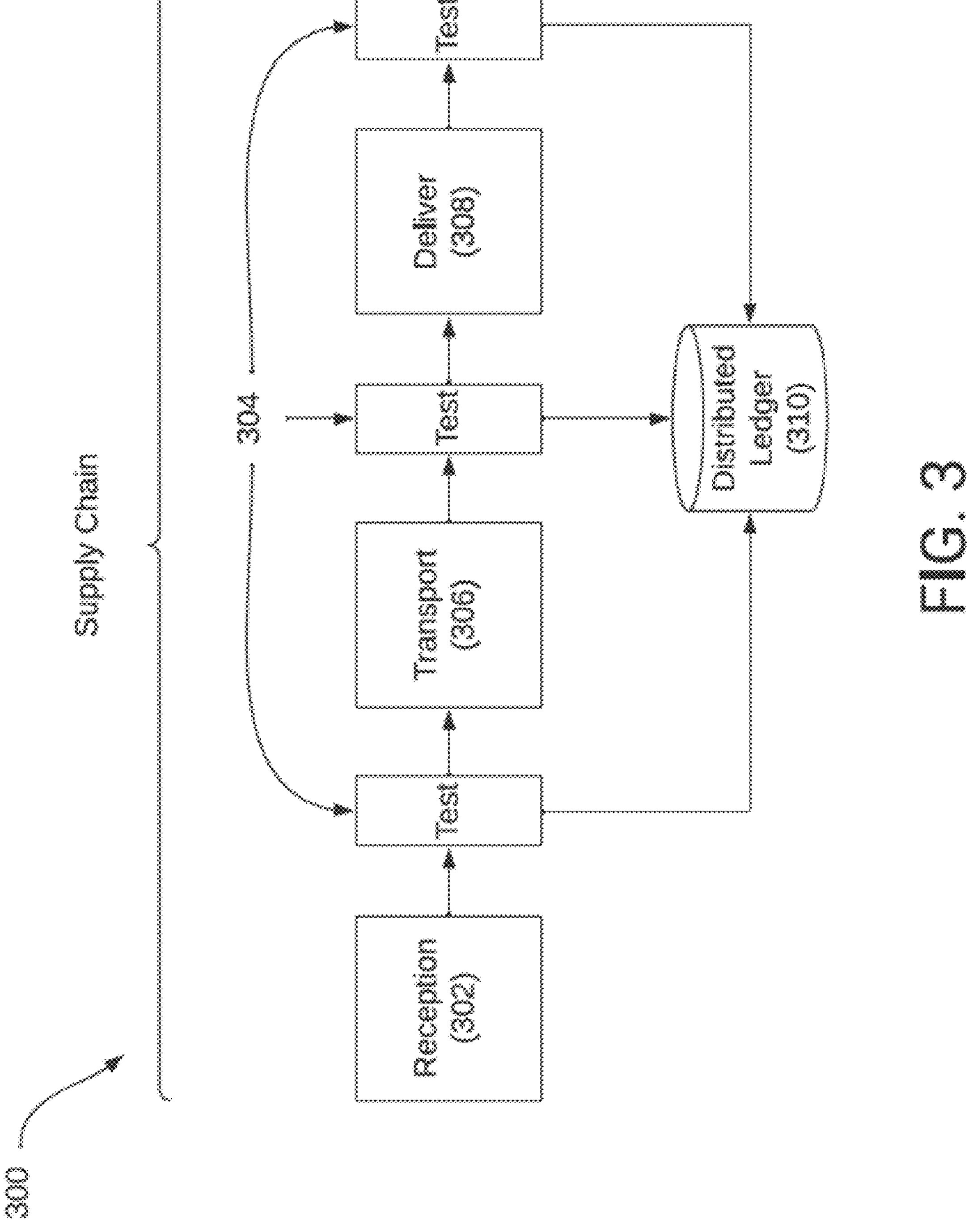
FIG. 3 illustrates an example of a connected supply chain, in accordance with various aspects of the subject technology.

FIG. 3 illustrates an example of a connected supply chain 300, according to some aspects of the disclosed technology. Connected supply chain 300 can include various steps or processes relating to the acquisition, refinement, and/or transport of various materials to support hydrocarbon extraction operations, such as drilling, cementing, and/or hydraulic fracturing, etc.

Initially, various raw materials, such as, proppant (e.g., sand), and/or water, etc., are extracted or received at a reception step 302. The raw materials may be tested at various test points 304 along supply chain 300, for example, to verify various characteristics, such as weight and/or other quality metrics associated with the materials. Testing performed at test points 304 may be performed using specialized and standardized test equipment. For example, test machinery implemented at test points 304 may conform to a predetermined standard or specification that is associated with a distributed ledger (e.g., ledger 310) to which the outputs/results can be stored. By way of example, water may be tested at various test points 304 to verify purity and/or pH characteristics. In some contexts, it may be desired that the pH of the water is above a predetermined threshold level, such as a pH above 6, or a pH above 8, etc. Proppant quality may be measured at any of the various test points to verify raw material amount (e.g., weight and/or volume), and/or to test a sieve size associated with the proppant. In some aspects, sieve sizes below a predetermined size may be desired. In such instances, various test points may be used to verify the quality of the proppant at the associated location along the supply chain 300. Additionally, test procedures may be conducted using other specialized hardware and/or software systems. By way of example, laser-based particle measurement systems may be used to test or verify proppant particle sizes and may further test or verify associated statistics (e.g., particle size distribution). Additionally, camera or other sensor data collected at any of test points 304 may be used to verify various characteristics or quality indicators associated with materials or services along the connected supply chain 300. By way of example, collected sensor data (e.g., camera image data) may be supplied to one or more machine-learning algorithms to make determinations (or classifications) about quality or other characteristics pertaining to the subject matter represented in the sensor data.

Images or other sensor data describing raw materials (e.g., water or sand) may be acquired continually by cameras or other sensors or on a periodic sampling basis, and such data may be utilized in raw data state or may be processed using a standard procedure to obtain signatures indicative of classes of quality.

Results obtained from conducting measurements/tests at various test points 304 may be stored to distributed ledger 310 along with any relevant metadata. By way of example, location and time stamp information associated with various quality tests may be stored to ledger 310. Additionally, information identifying the origin and/or entity (provider, supplier, etc.) of the materials and/or services may be recorded in supply chain metadata that is stored to ledger 310. Additionally, supply chain metadata may be recorded at various transport layer steps (306) and/or upon arrival at a final delivery location 308. By way of example, smart containers that are configured to record timestamp and/or geolocation information may be used to capture data about a path of raw materials before arrival at a final delivery location (308).

The pumping and blender system 250 may have piping at pipe inlets and outlets, valves, and manifolds for combining pump flows, and piping to a wellhead for conveyance into a well. A piping element, for example a piping element that is susceptible to damage such as internal erosion and/or corrosion which may vary depending upon the quality of fluids and/or solids provided by supply chain 300, may be outfitted with a sensor or periodically interrogated by a handheld sensor, to measure a parameter that may be related to a damage process or indicative of a deviation from a new or reference condition e.g. as a result of erosion and/or corrosion induced damage. An ultrasonic transducer may be employed for example to measure pipe wall thickness continually or periodically at a location along a pipe. Similarly, sensors may be placed proximate to working components of a pumping and blending system such as pistons, valves (e.g., check valves), or mixing rotors, any of which may be susceptible to damage such as erosion and/or corrosion, or mechanical failure, which may vary depending upon the quality of fluids and/or solids provided by supply chain 300. Such sensors may sense signals (e.g., acoustic) indicative of properties of the materials being blended and/or pumped and their interaction with the machine elements, and/or sense indications of damage. Camera or other images may be acquired of critical components prior to processing of these supply chain materials, and after. All such acquired data may be time and location stamped. Such data may be stored to distributed ledger 310 along with any relevant metadata.

In some instances, sensors and/or machinery that are implemented at various locations along supply chain 300 may be used to improve or modify various raw materials passing through supply chain 300. By way of example, at one or more of test points 304, additive may be supplied to water, for example, to raise or lower the pH of the water to a desired level. For proppant deliveries, specialized machinery may also be used to improve the quality of proppant being delivered, for example, by removing large pebbles or other debris through a sieving process, as necessary, to produce proppant that meets acceptable quality standards. Such interventions taken to improve the quality or otherwise change the character of raw materials may be recorded/stored to the distributed ledger 310.

Using the supply chain metadata stored to the distributed ledger 310, the various value contributions of different providers along supply chain 300 can be indelibly recorded and shared amongst participants, thereby enabling accurate value contributions to be associated with each. As used herein, ledger 310 can be (or can include) any of a variety of blockchain-based ledger architectures (e.g., an Ethereum blockchain), and/or any of a variety of Directed Acyclic Graph (DAG) based ledger architectures, such as the IOTA Tangle. Further details regarding the use of distributed ledger 310, e.g., implemented as a blockchain, are provided with respect to FIGS. 4 and 5, below.

Figure 4:
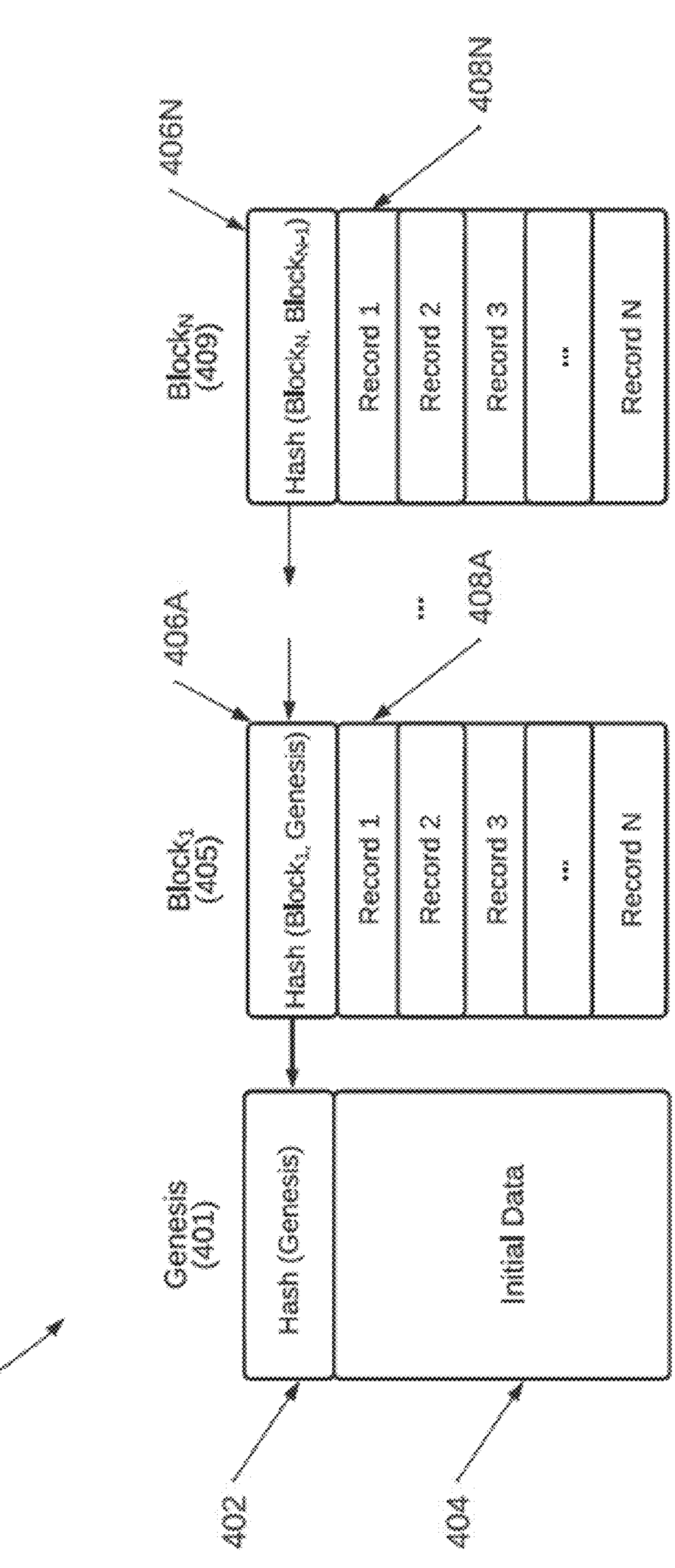
FIG. 4 shows a representation of blocks in a blockchain, in accordance with various aspects of the subject technology.

FIG. 4 shows a representation of blocks in a blockchain in one example embodiment. As used herein, the term "blockchain" may be used as an example of a "distributed ledger." An exemplary blockchain suitable for the purposes described herein may be an Ethereum blockchain, which may be used for storing supply chain data, as well as for executing smart contracts. Smart contracts may run on blockchains to ensure permanent storage of their data and provide strong resistance to data tampering. In some embodiments, a smart contract may be run by executing a script, validating the outcome of the script, and storing the smart contract and its result in a block.

In some aspects, smart contracts may be used to execute code (or implement algorithms) for performing various value calculations, e.g., for attributing conferred value in a supply chain to the proper providers. By way of example, smart contracts may be used to implement bilateral contracts that calculate an accrual, including a financial bonus (positive or negative). Depending on the desired attribution model, value contributions may be calculated using algorithms with a variety of inputs, including but not limited to static (or fixed) parameters, (e.g., TVD, well-length, number of stages, geologic zone, etc.); operational parameters, such as reports regarding provider contributions; and/or output parameters that relate to an ultimate value (e.g., initial production, 100-day production, etc.). Certain output parameters that relate to ultimate customer value may include data acquired (e.g., via pressure sensors, geophones, or optical fiber sensors in a wellbore being hydraulically fractured, at the earth's surface, and/or in adjacent wells) which may be related to the quality of that fracturing operation. Such raw data may include acoustic data, data spectra and signatures. Further data processing techniques may be employed using such data to localize acoustic events in the earth and may be used in determining standardized calculated measures such as stimulated reservoir volume ("SRV") or other standardized calculated measures which are relatable to the ultimate production, or to the frack cluster by frack cluster or zone by zone contribution to the production. Such data or calculated results may be continually or periodically acquired, and stored in the blockchain.

In general, a block may include an increasing block number, a hash, a reference to the immediately preceding block, a proof-of-work, and/or one or more transactions of executed smart contracts. In some examples, a block may also include a timestamp, a nonce, and identifiers related to a sender and/or a recipient. In the example of blockchain 400 the initial node or block, e.g., genesis block 401, includes a hash portion 402, and a ledger portion 404 containing some initial data. As illustrated, the subsequent block, e.g., Block1 405 contains ledger data 408A (e.g., Records 1-N), and is linked to the genesis block 401 via hash 406A. Subsequent blocks are similarly linked in a daisy-chain structure, back to the genesis block 401. New blocks can be added as transactions are issued on the blockchain 400 or, for example, as new supply chain metadata is written to the blockchain 400, with a current block represented as BlockN 409, which is added to the chain via hash 406N, and contains its own transaction record data 408N. The addition or minting of new block may be performed by specialized actors or entities in the blockchain ecosystem, such as certain approved participants in a supply chain context. Depending on the desired implementation, the blockchain may utilize different proving mechanisms that must be satisfied before new blocks can be added to the chain. Although the example of FIG. 4 references the use of proof-of-work proving mechanisms, other proofing mechanisms may be used. For example, data in blockchain 400 may be validated using proof of stake, proof of elapsed time, proof of activity, proof of burn, proof of capacity, and/or round-robin auditing mechanisms. Other proofing mechanisms are contemplated, without departing from the scope of the disclosed technology.

In practice, the blocks of the blockchain 400 (containing ledger data, e.g., supply chain metadata) are replicated amongst nodes (e.g., participant nodes) such that each node can have a complete replica of data stored on blockchain 400. To achieve the replication, the blockchain can utilize a consensus algorithm. Several types of algorithms exist and can be used depending on the assumptions made on the system as well as the guarantees desired. Once the ledger has been replicated, any actor in the system can verify its integrity and validity by validating the hashes.

Figure 5:
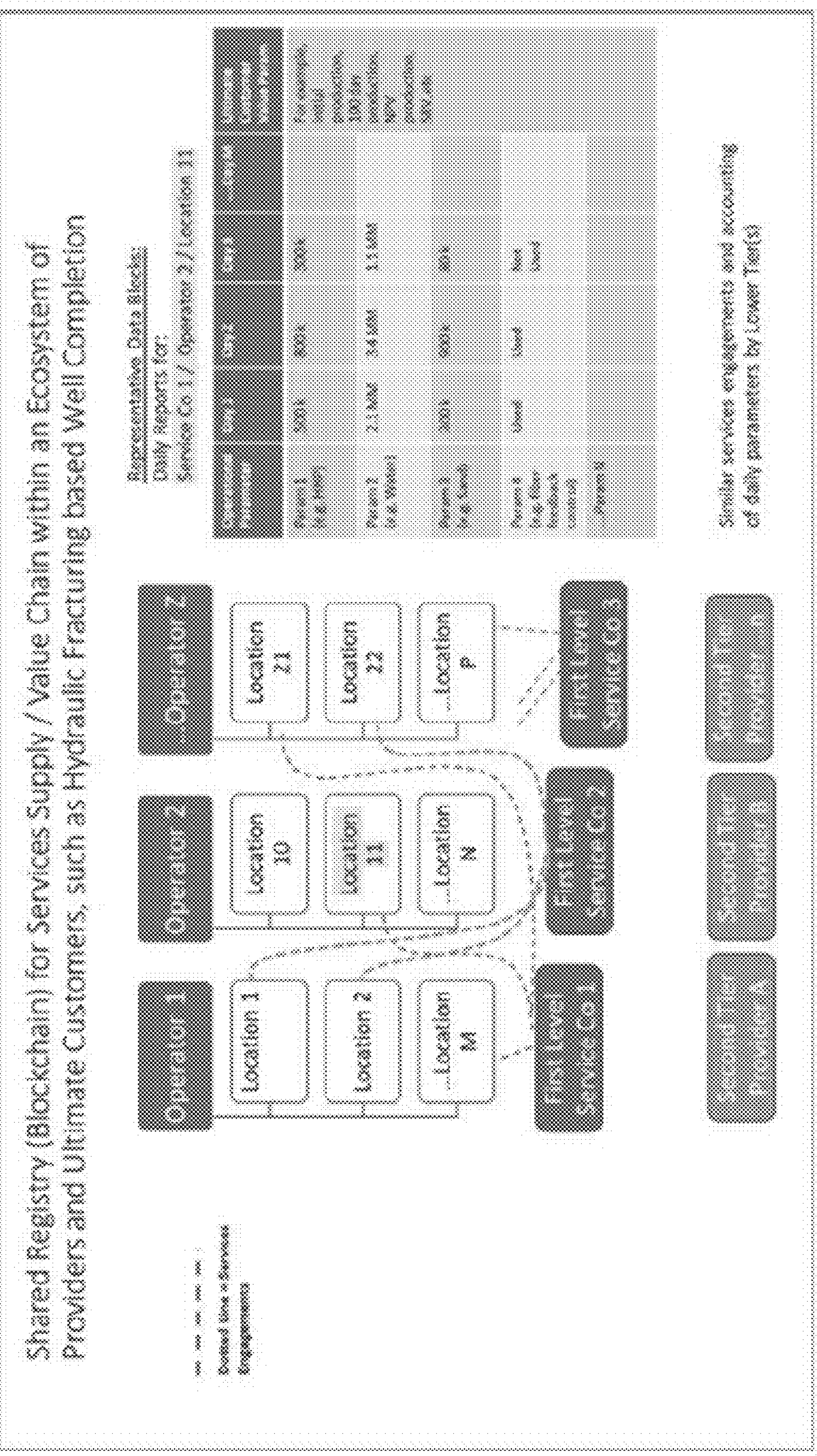
FIG. 5 illustrates an example of a blockchain architecture that has been implemented in the context of a services supply chain, which includes various participants at different provider tiers, in accordance with various aspects of the subject technology.

FIG. 5 illustrates an example of a blockchain architecture that has been implemented in the context of a services supply chain, which includes various participants at different participant tiers, according to some aspects of the disclosed technology. As indicated in the example of FIG. 4, records pertaining to any given services engagement can be associated with each participant that participates in the engagement. By storing the records (e.g., supply chain and/or value chain data) to the blockchain, each participant in the network can potentially access and verify the data for a given record, as well as all records for a given provider. Provider records may specify service tasks performed with respect to some unit of time, e.g., a week, a day, or an hour. As discussed above, provider services may be accompanied by timestamp information so that all (or a substantial number of) provider activities can be verified at small time granularities, e.g., minute-to-minute.

The implemented blockchain may be instantiated across multiple participant nodes. That is, blockchain access may be permissioned and only permitted amongst a private set of members, e.g., a sub-set of entities participating in a given supply/value chain. As discussed above, the consensus or proofing mechanism may also depend on the desired implementation. For example, a proof of stake protocol may be implemented whereby members that input data to a respective Data Block are responsible for having those Blocks verified by a reciprocal Member that is also Party to that Data Block, as each Data Block is typically in relation to a bilateral engagement contract engagement between two participants (e.g. operator and oilfield services company).

In some aspects, blockchain access may be predicated on certain use policies. By way of example, members may be denied access (and lose their data stake) if it is determined that they purposefully and/or maliciously provided or approved false data. In some aspects, certain data blocks may have unilateral inputs e.g. in a fracturing value example, the operator or Oil Company's self measured daily oil production. Other means of accountability in such cases, may include, but are not limited to: independent auditors, audits against publication, etc.

Distributed ledgers can be used to track characteristics of materials used in performing well completions through various supply chains. Specifically, various materials used in performing well completion are interrelated in the well completion. Accordingly, various characteristics of the materials can affect the well completion and in particular how the different materials are integrated in the well completion. Quality control and quality assurance for friction reducer products is not-standard across suppliers. Specifically, undisclosed changes in friction reducer materials may lead to unacceptable product stability, sometimes over extended periods of time, resulting in loss of useable product. With respect to water, participants may use water with a high total number of dissolved solids in the water (herein referred to as "TDS" of the water). Specifically, high TDS water is used to compensate for the lack of freshwater or access to brine disposal wells. Water quality has a great impact on friction reducer performance. In turn, friction reducers have different TDS tolerance and different tolerances to specific ions that make up the total TDS, e.g. iron divalent cations, and sulfates. High concentrations of these problematic ions can negatively affect the friction reducer performance. Poor water quality can cause friction reducer polymers to not fully invert or fully hydrate causing poor friction reducer performance. Further, poor friction reducer performance often leads to erosion of fracturing equipment, high friction pressure, more fuel usage to power pumping equipment, and can necessitate the use of higher concentrations of friction reducers, leading to potential formation damage, and increasing costs of fracturing treatments.

Friction reducer performance can also be impacted by chemicals, particularly oxidizers, that are added during the water treatment stage. Water treatment can be performed by a third party with limited visibility to the well completion service company. Over treatment can be a cause of unexpected decrease in performance. Additionally, friction reducers have different tolerances for well lateral lengths. Specifically, some friction reducers can have decreased performance in longer laterals than other.

Figure 6:
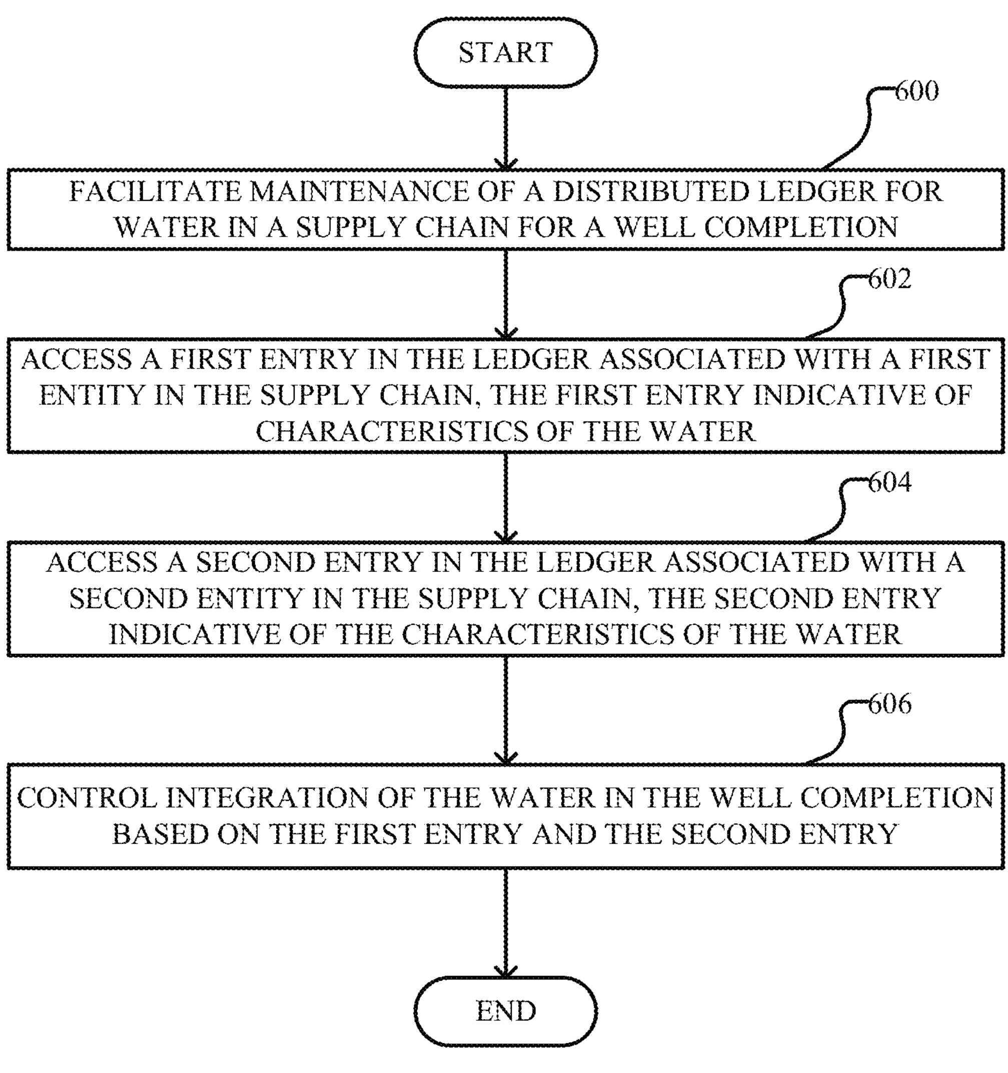
FIG. 6 illustrates a flowchart for an example method of controlling water integration into a well completion based on entries in a distributed ledger that tracks the water through a supply chain, in accordance with various aspects of the subject technology.

The disclosure now continues with a discussion of integrating a supply chain of water for a well completion into a distributed ledger. Specifically, FIG. 6 illustrates a flowchart for an example method of controlling water integration into a well completion based on entries in a distributed ledger that tracks the water through a supply chain. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Each module shown in FIG. 6 represents one or more steps, processes, methods or routines in the method.

At step 600, maintenance of a distributed ledger for water in a supply chain for a well completion is facilitated. In facilitating maintenance of a distributed ledger for water in a supply chain for a well completion, applicable systems and methods can be implemented in facilitating the maintenance of the distributed ledger. Specifically, contracts, e.g. smart contracts, can be entered into that requires inputting data that is relevant to the procurement and delivery of water to a well completion provider. For example, a contract can be entered into with an entity for sourcing water that requires that the entity test the water and input data indicative of measured characteristics of the water to the distributed ledger. Further, auditors can be integrated into the supply chain to test the water at various points in the supply chain and input data indicative of measured characteristics of the water to the distributed ledger. Sensors may be employed at the water supplier's source or transfer conduit, and/or at a receiving conduit or storage tank or pond, to automatically, periodically or continuously, test a critical or representative parameter such as conductivity or pH and automatically load such test data into the distributed ledger.

Facilitating maintenance of the distributed ledger for water in the supply chain can include setting up the systems for implementing the distributed ledger. Further, facilitating maintenance of the distributed ledger for water in the supply chain can include maintaining the systems for implementing the distributed ledger as water moves through the supply chain to a well completion provider. For example, facilitating maintenance of the distributed ledger can include creating and maintaining either a consortium ledger or a private ledger for water in the supply chain. Further, facilitating maintenance of the distributed ledger can include controlling entity access to the distributed ledger. Controlling entity access to the distributed ledger for water can include granting entities read and/or write access to the distributed ledger.

At step 602, a first entry in the ledger associated with a first entity in the supply chain is accessed. An entity, as used herein, can include an applicable individual, company, or location associated with movement of a material or product through a supply chain. Specifically, an entity can include a producer, a vendor, a warehouse, a transportation company, a distribution center, a well completion site, a well completion provider in a supply chain, or an operator of a well or oilfield. With respect to the first entry in the ledger, the first entity in the supply chain can be an entity for sourcing the water in the supply chain or an entity associated with sourcing of water in the supply chain. For example, the first entity can be an auditor tasked with testing the water as it is sourced. The first entry can be accessed by an applicable entity capable of accessing the distributed ledger for water in the supply chain. For example, the first entry can be accessed by a well completion provider who can use the water in a well completion.

The first entry includes information indicative of characteristics of the water. Characteristics of the water, as used herein, can include applicable characteristics of the water that can affect a well completion. For example, characteristics of the water can include conductivity of the water, pH of the water, a source of the water, and whether the water is potable.

Characteristics of the water can be gathered through applicable sensors during applicable tests. For example, pH, conductivity, dissolved oxygen, oxidation-reduction potential, density, temperature, ion selective electrodes. Sensors can automatically acquire data indicative of characteristics of the water. Sensors may be positioned in or on a conduit conveying the bulk flow of such water, or a bypass side stream. Samples may be taken from time to time from (for example) a flow conduit or tank or pond, for sensing and analysis separate from the chain of fluid conveyance. As follows, this data can be automatically added to the distributed ledger. The data can be automatically added to the ledger according to specific rules for adding data to the ledger. The rules can include applicable rules that specify when data should be written to a distributed ledger associated with a water supply chain. For example, a rule can specify to write data to a ledger when water is received at a wellsite. In another example, a rule can specify to write data regarding characteristics of water once the data describing the characteristics of the water is obtained. Data relating to such parameters may also be gathered in a manual process (e.g. by a person) rather than automated sensing process. This may be done in a periodic or routine manner, or in conduct of an audit. The resulting data from such manual process may be added to the ledger.

Characteristics of the water can be gathered through a multi-sensor configuration over a length of pipe used in transporting water during a well completion. For example, a first pressure sensor can be integrated at surface with a pipe conveying water during a fracturing operation. Further, a second pressure can be integrated downhole with the pipe. Pressure measurements made by the sensors can be compared to determine parameters such as pressure loss and friction factors. In turn, these parameters can be used to identify characteristics of the water. Further, these parameters can be used to identify characteristics of a friction reducer, as will be discussed in greater detail later, that is used during the well completion.

Including characteristics of the water on the distributed ledger allows for the tracking of the water and potentially changing characteristics of the water through the supply chain. This is important in performing well completions as water characteristics, e.g. otherwise water quality, can have great impacts on a well completion. Specifically, conductivity of water is related to the TDS of the water. The TDS of water can greatly impact performance of friction reducers in well completion operations. Further the pH of the water can greatly impact the equipment that is used in performing a well completion. For example, water with a lower pH level can damage pumps that are used in well completions. This can cost millions of dollars in replacement parts without even considering the monetary loss for well completion providers due to equipment downtime.

Characteristics of the water that are included on the distributed ledger can also be used in selecting a friction reducer to be used with the water during a well completion. Specifically, certain friction reducers can perform better during a well completion, e.g. perform better at reducing friction, for water having specific characteristics. In turn, specific friction reducers or compositions of friction reducers can be selected based on the water characteristics.

At step 604, a second entry in the ledger associated with a second entity in the supply chain is accessed. The second entity can be an applicable entity that is after the first entity in the supply chain. For example, the second entity can be a transporter who receives and transports the water after the first entity sources the water. As follows, the second entry can be made in the distributed ledger after the first entry is made in the distributed ledger.

The second entry, just like the first entry, also indicates the characteristics of the water. The characteristics of the water included in the second entry can be the same characteristics that are identified and included in the first entry. This can be because the characteristics can be measured again in association with the second entity and remain unchanged with respect to the characteristics that were measured in association with the first entity. For example, a water supplier can measure the characteristics at the source location of the water, and an auditor can measure unchanged characteristics of the water as it is transported through the supply chain. Further, the characteristics of the water included in the second entry can be the same as the characteristics included in the first entry because the characteristics are not determined again in association with the second entity. For example, characteristics of the water can be determined at the source but not determined again after the water is transferred to a transporter of the water.

The characteristics of the water included in the second entry can be different from the characteristics of the water included in the first entry. This reflects changing characteristics of the water as it moves through the supply chain. For example, the conductivity and the pH of the water can change, e.g. due to contamination, as the water is transported from the source and through the supply chain to a well completion site. Further, this can reflect an inaccurate characterization of the water, e.g. as determined during movement of the water through the supply chain. These changing characteristics of inaccuracies can have detrimental effects during a well completion, especially when the initial characteristics are relied on in performing the well completion. For example, an oilfield services company can expect the water to have an initial pH level and plan well completion operations based on this pH level. However, the actual pH level of the water can change and ultimately lead to damaged equipment if the company does not account for the changed pH level.

At step 606, integration of the water in the well completion is controlled based on the first entry and the second entry. Specifically, the first entry and the second entry can be compared to determine whether the characteristics of the water have changed as the water moves through the supply chain. As follows, integration of the water into the well completion can be controlled based on whether the characteristics of the water have changed and how the characteristics of the water have changed. In instances where the as-sourced water was suitable for integration and the characteristics of the water remain unchanged or within a threshold amount with respect to the as-sourced water characteristics, then the water can be integrated directly into the well completion. For example, potable water does need to be filtered if the conductivity of the water remains within a threshold amount relative to the conductivity of the sourced potable water.

In controlling integration of the water into the well completion, applicable treatments and processing steps can be applied to the water. Specifically, applicable treatments and processing steps can be applied to the water based on the changing characteristics of the water, e.g. as indicated by comparing the first entry and the second entry. For example, if the pH of the water decreases through the supply chain, then the water can be pretreated to increase the pH before it is introduced into hydraulic fracturing tanks for a well completion. In another example, if a pH of the water decreases through the supply chain, then the water can be treated at a stage before a pumping stage, e.g. in a blender during a blending stage. The treatments and processing steps can be applied based on a degree that the characteristics of the water change through the supply chain, e.g. as indicated by comparing the first and second entries. For example, a pre-treatment step can be designed or modified based on how much the pH of the water changes through the supply chain.

Figure 7:
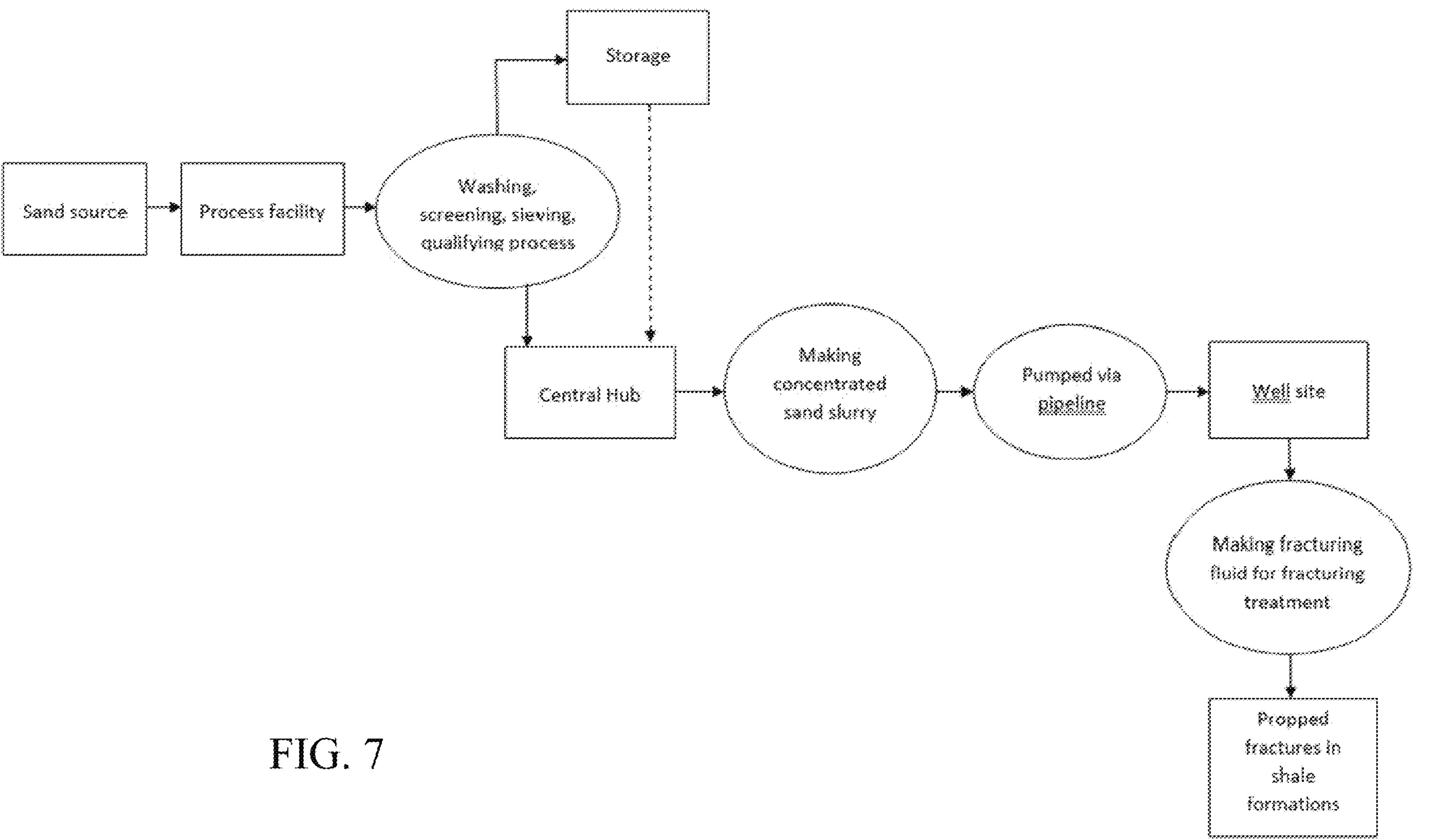
FIG. 7 illustrates a conceptual flow of a proppant supply chain for a well completion that can be integrated on a distributed ledger.

The disclosure now continues with a discussion of integrating a supply chain of proppant for a well completion into a distributed ledger. Specifically, FIG. 7 illustrates a conceptual flow of a proppant supply chain for a well completion that can be integrated on a distributed ledger. Data generated at any of the steps in the supply chain represented in FIG. 7 can be written to a distributed ledger for the techniques described herein.

In the proppant supply chain shown in FIG. 7, sand samples from potential sand sources, including open pit mines, quarries, and riverbeds, are collected to determine if the sand can be used in hydraulic fracturing treatments. If the sand is identified as suitable for use in hydraulic fracturing treatments, then it is extracted and transported to processing facilities.

At the processing facilities, the raw sand undergoes various treatments to remove impurities. Further, processing at the processing facilities can include washing, screening, crushing, and sieving to modify the raw sand. This processing can be performed to create sand that meets certain specifications for a hydraulic fracturing treatment.

Various techniques can be applied to characterize the sand, e.g. at the processing center as part of determining whether the sand meets certain specifications. Specifically, particle size analysis can be performed to qualify the sand. Particle size analysis can include measuring the size distribution of sand particles through applicable techniques, such as sieve analysis or laser diffraction. Another technique for characterizing the sand includes crush resistance testing. Crush resistance testing includes subjecting the sand to varying pressures to determine the crush resistance properties. Yet another technique for characterizing the sand includes acid solubility testing. Through acid solubility testing, the sand is exposed to acid solutions and the amount of dissolved material is measured. Acid solubility testing can help in determining the potential for sand dissolution or fines generating when exposed to acidic fluids. Another technique for characterizing the sand includes conductivity testing. In conductivity testing, the flow conductivity of the sand is measured to determine the ability of the sand to allow the flow of fluids while keeping fractures open downhole. Another technique for characterizing the sand includes sieve analysis to determine the sand's distribution across different sieve sizes. Yet another technique for characterizing the sand includes sphericity and ovality testing to measure the roundness and shape of the sand particles. The characteristics of the sand can be stored on a distributed ledger according to the techniques described herein.

After processing at the processing center, the sand can be moved to central hubs. Central hubs, or otherwise distribution centers, can be strategically located near fracturing operations. At the central hub, sand from various sources, e.g. different mines and processing facilities, can be tagged and identified by assigning a unique identified or digital asset to each batch of sand, e.g. in the form of a serial number, a barcode, a QR code, an RFID tag, or another applicable identifier. This information can be stored on a distributed ledger according to the techniques described herein.

Sand from different sources and processing facilities can be mixed at the central hubs. Specifically, sand of the same particle-size distribution and from different sources and processing facilities can be mixed. As follows, the sand can be used in forming concentrated fracturing sand slurry and pumped to fracturing/well sites. Specifically, concentrated fracturing sand slurry having a sand concentration of 22 to 28 pounds per gallon (herein "ppg") can be formed. The concentrated fracturing sand slurry can then be transported by rail and/or truck, and in some implementations may be injected through a pipeline to a well site from the central hub. At the well site, the concentrated slurry can be diluted with a liquid additive to create a fracturing fluid with a specific sand concentration for a well completion. Then the resulting fracturing fluid can be used to prop open fractures as part a hydraulic fracturing treatment.

A small number of pumps can be dedicated to pumping the concentrated sand slurry in comparison to a larger number of pumps that are dedicated to pumping the fracturing fluid during the well completion. Further, a positive displacement pump, e.g. piston diaphragm pump, can be used to pump the concentrated sand slurry. The concentrated sand slurry can be placed in storage areas at the well site, e.g. open ground storage areas, holding tanks, silos, containers, and sand boxes.

The concentrated sand slurry can include a gelling agent that gels the aqueous fluid to form the concentrated sand slurry. The gelling agent can comprise an applicable viscosifying compound to suspend sand particles. For example, the gelling agent can comprise guar gum, derivatized guars, such as hydroxypropylguar, and derivatized cellulosics.

A carrier fluid for forming the concentrated sand slurry can include an applicable fluid, such as aqueous fluids, non-aqueous fluids, slick water fluids, aqueous gels, viscoelastic surfactant gels, foamed gels, emulsions, and a combination thereof.

Pipeline pigs, and preferably elastic deformable and reusable pigs can be deployed in the pipelines between the central hubs and the well sites to displace, clear, and clean the concentrated sand slurry from the pipeline. The pigs may be prepared from elastomers manufactured at the central hubs.

The supply chain can be applied for applicable proppant materials, such as fine sands having less than 25 microns in size. Further, crushed glass, fly ash, calcium carbonate, and magnesium carbonate, including materials that may be a waste stream from an industrial process, may be used as or with proppant materials, and may be included in the supply chain.

There are many advantages of the pipeline approach to providing a concentrated sand slurry from a central hub to well sites. Specifically, a large volume of frac sand can be transported to well sites in a short amount of time. More specifically, a delivery rate of 1,000 gallons per minute of fluid can be transported carrying 25 ppg of sand resulting in 25,000 lbs per minutes. Further, this can remove sand dusting issues at well site locations. Additionally, this can increase roadway safety and decrease dependence on heavy truck to deliver sand and water.

Figure 8:
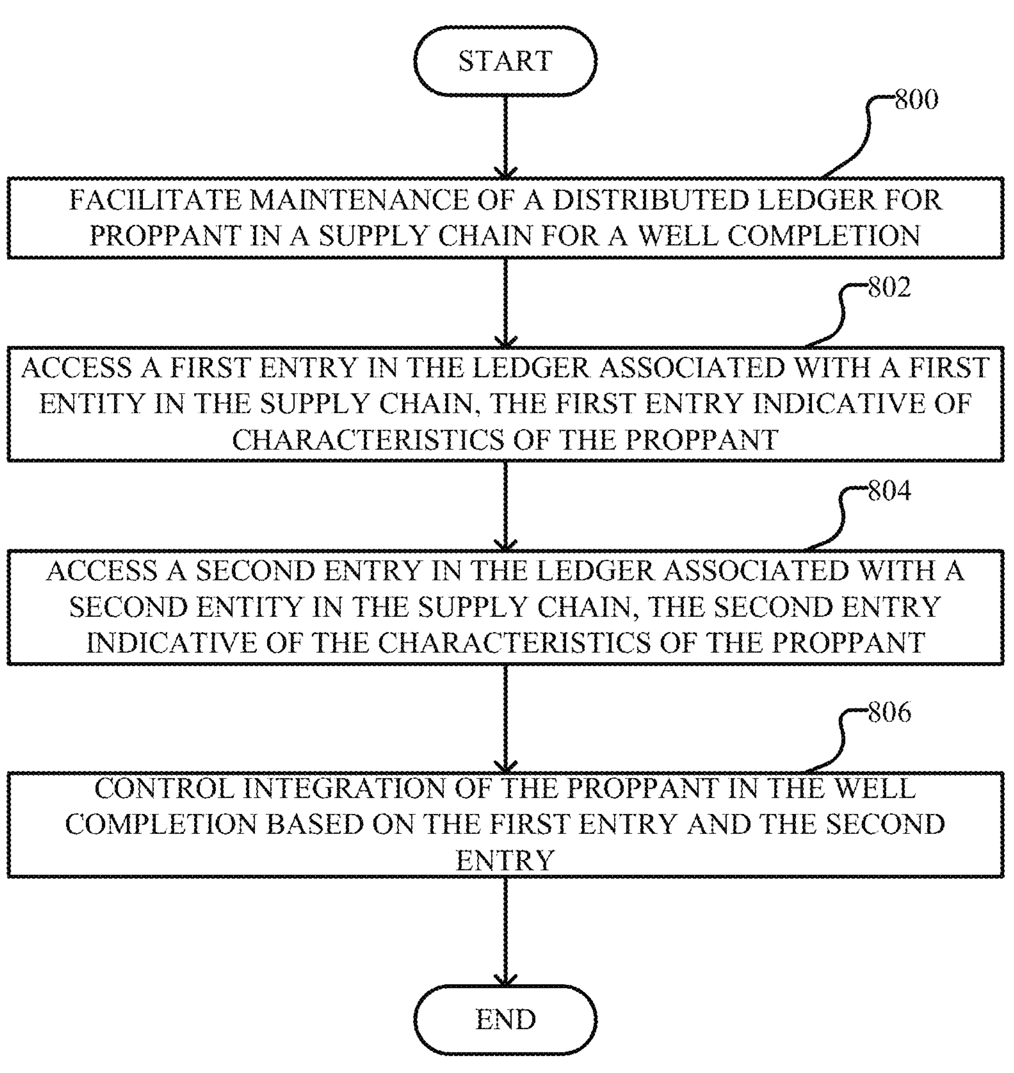
FIG. 8 illustrates a flowchart for an example method of controlling proppant integration into a well completion based on entries in a distributed ledger that tracks the proppant through a supply chain, in accordance with various aspects of the subject technology.

FIG. 8 illustrates a flowchart for an example method of controlling proppant integration into a well completion based on entries in a distributed ledger that tracks the proppant through a supply chain. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated. Each module shown in FIG. 8 represents one or more steps, processes, methods or routines in the method.

At step 800, maintenance of a distributed ledger for proppant in a supply chain for a well completion is facilitated. In facilitating maintenance of a distributed ledger for proppant in a supply chain for a well completion, applicable systems and methods can be implemented in facilitating the maintenance of the distributed ledger. Specifically, contracts, e.g. smart contracts, can be entered into that requires inputting data that is relevant to the procurement and delivery of proppant to a well completion provider. For example, a contract can be entered into with an entity for transporting proppant that requires that the entity test the proppant upon receipt of the proppant and input data indicative of measured characteristics of the proppant to the distributed ledger. Further, auditors can be integrated into the supply chain to test the proppant at various points in the supply chain and input data indicative of measured characteristics of the proppant to the distributed ledger.

Facilitating maintenance of the distributed ledger for proppant in the supply chain can include setting up the systems for implementing the distributed ledger. Further, facilitating maintenance of the distributed ledger for proppant in the supply chain can include maintaining the systems for implementing the distributed ledger as proppant moves through the supply chain to a well completion provider. Further, facilitating maintenance of the distributed ledger can include controlling entity access to the distributed ledger.

At step 802, a first entry in the ledger associated with a first entity in the proppant supply chain is accessed. With respect to the first entry in the ledger, the first entity in the supply chain can be an entity for sourcing the proppant in the supply chain or an entity associated with the sourcing of the proppant in the supply chain. For example, the first entity can be a provider of a quarry that is used to source sand. The first entry can be accessed by an applicable entity capable of accessing the distributed ledger for proppant in the supply chain. For example, the first entry can be accessed by a well completion provider who can use the proppant in a well completion.

The first entry includes information indicative of characteristics of the proppant. Characteristics of the proppant, as used herein, can include applicable characteristics of the proppant that can affect a well completion. For example, characteristics of the proppant can include a source of the proppant, a size of the proppant, a composition of the proppant, a grain size distribution of the proppant, dimensional measurements of grains of the proppant, roundness measurements of the grains of the proppant, an amount of flow that the proppant will allow, an acid solubility of the proppant, a crush resistance of the proppant, the solubility of the proppant, and the turbidity of the proppant.

Characteristics of the proppant can be gathered through applicable sensors during applicable tests. For example, instruments and techniques can be used to "fingerprint" sand and tie it back to its source from bulk mineralogy geochemistry and/or isotopic composition. Techniques may include one or more of simple photographic image analysis (e.g. using widely available digital cameras), optical petrography, Raman spectroscopy, scanning electron microscope techniques, x-ray diffraction, ICP-MS, x-ray fluorescence, and laser induced breakdown spectroscopy.

Physical (e.g. size and shape) characteristics of the proppant may be measured in various manners. A settling column or other techniques may be used to determine grain size or grain weight distribution. Further, crush resistance testing can be performed on the proppant according to ISO 13503-2 using an electromechanical test system.

High resolution photographs or images of proppant can also be used to identify characteristics of the proppant. The images may be obtained with cameras or other devices, on single or large number of grains e.g. such sand grains removed from or resident in a storage volume, or transport container. High speed photography and taking many frames (e.g. 100 or 1000 or more per second or less) of a flowing sand may be performed, e.g. through an optically clear window in a conduit, from above an open top conveyance channel, or as the sand is being dumped through the air to a storage volume or a transportation container or a conduit, or in any other configuration providing line of sight for imaging a volume (i.e. many grains) of sand. Dynamic image analysis may be used to characterize a sand grain or a distribution of the sand grains on a variety of image parameters such as equivalent projected particle circle diameter, Feret diameter, aspect ratio, sphericity, convexity, and roundness. Machine learning techniques may be used to form a baseline of high quality images of multiple sand grains, to result in a model with high confidence of correctly characterizing a volume of sand, its source, or its characteristics, from digital images taken with a smart-phone quality camera at various points in the supply chain Analysis samples used in identifying proppant characteristics may be single grains or multiple grain samples. Characterizing and/or fingerprinting may be established using single samples, or multiple samples, potentially including statistical techniques. Mixtures of sand from two or more sources may be characterized and/or fingerprinted and the different sources (and potentially from two or more providers) and proportions within the mixture may be determined e.g. using such statistical techniques.

The characteristics or fingerprints of sand sources of past, current and/or prospective members of a supply chain or an area (e.g. the Permian Basin) may be established, to be accessible in a blockchain process, to aid in proper identification of proppant sand at various stages of the supply chain. More or higher fidelity sets of sensors and analyses (which may include simple on site testing, and/or testing and analysis in a laboratory) may be employed as new sand supply participants enter the supply process, to establish baseline characteristics or fingerprints, and a less extensive sensor or set of sensors (e.g. capturing images with a smart phone) may be used at other points in the supply chain to test the sand. A statistical or other algorithm and/or neural network can be trained using combinations of baseline data and simple sensor data. In turn the trained algorithms and models may be employed in determining a likely composition and/or source of sand at various points in the supply chain.

Sensors can automatically acquire data indicative of characteristics of the proppant. As follows, this data can be automatically added to the distributed ledger. The data can be automatically added to the ledger according to specific rules for adding data to the ledger. The rules can include applicable rules that specify when data should be written to a distributed ledger associated with a proppant supply chain. For example, a rule can specify to write data to a ledger when a proppant is received at a wellsite. In another example, a rule can specify to write data regarding characteristics of a proppant once the data describing the characteristics of the proppant is obtained.

Characteristics of the proppant can also include characteristics of a tracer or dopant that is added to the proppant. A tracer can include an applicable material that is detectable in the proppant through an applicable mechanism to allow for tracing of the dopant and the corresponding proppant through the supply chain. Specifically, the tracer can be a material that is detectable when exposed to a specific form of electromagnetic radiation, e.g. a dye that is detectable with ultraviolet radiation.

A tracer can be added to the proppant at an applicable point in the supply chain. Specifically, the tracer can be added to the proppant as or after the proppant is mined. This can be done using a spray or other application of an aqueous solution inclusive of the tracer, to permeate the material being mined or into any collected volume or container containing the mined material. In some examples, a tracer can be added to the water that is used to wash the proppant to remove soil and other materials outside the desired proppant composition. In another example, the tracer can be added to the proppant after the proppant is processed to meet a specification, or at a later point in the supply chain, e.g. after having been tested per a specification.

A single tracer material (e.g. a dye) may be applied to all or part of the proppant material. A large volume of proppant material from a single source or with a set of characteristics of interest for tracing (e.g. grain size distribution) may have a portion (e.g. 50%, 5%, 1%, or less) of the volume marked and still have the benefit of such marking, i.e. ability to identify that particular proppant during further steps of the supply chain. A single tracer material may be applied in two or more different concentrations (e.g. aqueous concentrations, resident time, and/or binding concentrations), to encode information (e.g. source location, composition, date) which can be resolved by detection of the concentration at later steps of the supply chain. Two or more tracer materials which are distinguishable in detection may be applied to encode information as described above. Two or more tracer materials may be applied together in a pre-determined ratio of concentration for a particular proppant volume of application, and/or may be applied separately on different proppant volumes of application, in a pre-determined ratio of concentration and/or volumes of application, to encode information as described above. These and/or other approaches may be used with tracer materials to mark the proppant, e.g. sand, in a manner such that data can be encoded within a volume of such proppant, for detection and decoding later in the supply chain.

Sand grains can represent 65% to 95% quartz, with other minerals present within the grains. These other minerals may include one or more of the group consisting of: a silicate class mineral, such as feldspar, clay minerals (e.g. illite, smectite, illite-smectite combinations, chlorite, kaolinite, and other less common types), mica (e.g. muscovite, biotite, and other types), a heavy mineral, such as garnet, zircon, amphibole, and other less common types); a carbonate class mineral, such as calcite, aragonite, dolomite, siderite, ankerite, and other less common types; a sulfate class mineral, such as anhydrite, gypsum, and others less common types; a sulfide class mineral, such as pirite, sphalerite, galena, and others less common types; an oxide class mineral, such as hematite, magnetite, ruitile and polymorphs, ilmenite, and other less common types; a halide class mineral, such as sodium chloride, sylvite, and other less common types; and a phosphate class mineral, such as apatite.

The marker can be capable of binding to more than one mineral. The marker may be adapted to bind to organic materials, more than one type of organic material, or both mineral and organic material. Particular tracers or markers (e.g. dyes) may be selected for its or their affinity to bind with the particular minerals present within the sand grains. The marker preferably comprises a substance detectable by spectral response, eg a dye detectable by color. Such dye may be selected from the group consisting of: "acid blue" water-soluble dyes and "oil red" oil-soluble dyes. Other optically active substances which could serve as spectrally detect able markers may include molecular iodine, iron oxide class pigments, chrome oxide pigments, mica ferric oxide pigments, other oxide or inorganic pigments, or organic pigments. "Methylene blue" pigment may be used. Candidate dyes may also include coomassie blue, malachite green, safranin orange. Other markers may be used which are detectable in the non-visible spectrum. Certain substances may serve as markers which may be less detectable until an activation step is taken, following which the marker would be more easily detected spectrographically. Examples of such substances may include amides, amines, or phenols. Numerous activator chemicals are known, one example being catalog #EM-14750-1 from VWR International. The bond between a marker substance and a target particulate may for example be polar bonds, van der Wal bonds, or di-pole/di-pole bond. Certain marker substances may chemically bond to the target particulate.

In some cases an oil soluble tracer or tracers may be used, and an oil used in the application of the tracers in a similar manner as described above for the water-based approach. The marker(s) may comprise paints or pigments capable of adhering to the sand particles and detectable by color. In some cases markers may comprise a low level radioactive material detectable by radioactivity detection devices at locations along the supply chain. The markers may comprise additive particle which are detectable or distinguishable, for example pre-dyed sand added to the larger volume being tracked, to accomplish the encoding as described above. The markers may comprise transponder devices, such as those developed by the Advanced Energy Consortium under the University of Texas Bureau of Economic Geology, which may be sized on the order of the size of the proppant, and may have a bar code type encoding (whether by hardware, firmware, or software) which is detectable and distinguishable with a simple radio transmitter/receiver device at locations along the supply chain.

Many approaches may be used for detecting and distinguishing the particular markers and/or concentration of tracers or markers within a material (e.g. proppant sand) and the associated encoded data at locations along the supply chain, such as transfer points, or immediately prior to introducing into a hydraulic fracturing process. Samples may be removed from the main volume for off-line testing. Monitoring may be established at or upon a conveyance or storage, to obtain data continuously, periodically, or on demand. The monitoring may include a camera or high speed multi-frame camera. The monitoring may include a sensor system, which may utilize a radiation source (visible light, laser, UV, IR, low level radiation from a nuclear source, or other types or spectra) directed towards the surface of the static or moving volume or material. An electric conductor winding may fully or partially surround a conveyance or be adjacent, so as to direct an electric or magnetic field to be interacted with the static or moving volume of material. A sonic or ultrasonic transmitter may be positioned near the static or moving volume of material. Energy may thus be imposed upon the material and excite a marker or tracer, or induce power into an electronic device being used as a tracer The marker or tracer may as a result of the excitation, emit energy of a spectra or other characteristic which is specific to the tracer material. A detector, for example an antenna, photovoltaic sensor, photoresistor, photodiode, photomultiplier tubes, spectrophotometer, colorimeter, and other known detectors, may be packaged proximate and may be offset from the source, to receive the energy emitted from the tracer or marker within the proppant or other material to be tracked. Signal conditioning electronics may also be included in this sensing system, along with control logic or computing to provide an output indicative of presence or absence of the particular materials, or distinguishing of materials, or characteristics of materials, as encoded within the tracer or marker. This data may be directly linked to a ledger, or a human operator may input the data into the ledger.

Characteristics of the proppant can be identified, e.g. by an entity in the supply chain, through an applicable technique. Specifically, the characteristics of the proppant can be determined through a camera, a sensor, a laser, or a combination thereof. For example, lasers can be used to measure characteristics of post-screened sand. In another example, a camera can be used to capture images of grains of sand. In other examples, one or more of the sensing techniques described in relation to sensing of tracers, may also be applicable directly to the properties of the sand. As follows, the grains of sand can be measured through an applicable technique as part of characterizing the proppant. The characteristics of the proppant can be identified through a machine learning technique. Specifically, machine learning techniques can be used to characterize gathered data of the proppant in identifying the characteristics of the proppant.

Characteristics of the proppant can be identified automatically, e.g. by sensors in a flow path of slurry that includes the proppant. Further, characteristics of the proppant can be identified from samples of proppant. The samples of proppant may be taken from time to time from (for example) a flow conduit or storage, for sensing and analysis separate from the chain of proppant conveyance. As follows, this data can be automatically added to the distributed ledger. Data can be automatically added to the ledger according to specific rules for adding data to the ledger. The rules can include applicable rules that specify when data should be written to a distributed ledger associated with a proppant supply chain. For example, a rule can specify to write data to a ledger when a proppant is received at a wellsite. In another example, a rule can specify to write data regarding characteristics of a proppant once the data describing the characteristics of the proppant is obtained. Data relating to such parameters may also be gathered in a manual process (e.g. by a person) rather than automated sensing process. This may be done in a periodic or routine manner, or in conduct of an audit. The resulting data from such manual process may be added to the ledger.

Including characteristics of the proppant on the distributed ledger allows for the tracking of the proppant and potentially changing characteristics of the proppant through the supply chain. This is important in performing well completions as varying proppant characteristics can have great impacts on a well completion. Specifically, impurities in the proppant can damage equipment. In another example, heavier proppant material can increase the need for greater flow rates, thereby changing a well completion plan.

At step 804, a second entry in the ledger associated with a second entity in the supply chain is accessed. The second entity can be an applicable entity that is after the first entity in the supply chain. For example, the second entity can be an auditor who grades the proppant after the first entity mines the proppant. As follows, the second entry can be made in the distributed ledger after the first entry is made in the distributed ledger.

The second entry, just like the first entry, also indicates the characteristics of the proppant. The characteristics of the proppant included in the second entry can be the same characteristics that are identified and included in the first entry. This can be because the characteristics can be measured again in association with the second entity and remain unchanged with respect to the characteristics that were measured in association with the first entity. For example, a proppant supplier can measure the characteristics at the source location of the proppant, and an auditor can measure unchanged characteristics of the proppant as it is transported through the supply chain. Further, the characteristics of the proppant included in the second entry can be the same as the characteristics included in the first entry because the characteristics are not determined again in association with the second entity. For example, characteristics of the proppant can be determined at the source but not determined again after the proppant is transferred to a well completion provider.

The characteristics of the proppant included in the second entry can be different from the characteristics of the proppant included in the first entry. This can reflect changing characteristics of the proppant as it moves through the supply chain. For example, impurities can be added to the proppant through the steps of transporting the proppant from the source and through the supply chain to a well completion site. Further, this can reflect an inaccurate characterization of the proppant, e.g. as determined during movement of the proppant through the supply chain. These changing characteristics or inaccuracies can have detrimental effects during a well completion, especially when initial characterizations are relied on in performing the well completion. For example, a well completion provider can expect the proppant to have a specific average grain size and plan well completion operations based on this average grain size. However, the actual grain size of the proppant can be different requiring greater pumping pressure during a well completion.

At step 806, integration of the proppant in the well completion is controlled based on the first entry and the second entry. Specifically, the first entry and the second entry can be compared to determine whether the characteristics of the proppant have changed as the proppant moves through the supply chain. As follows, integration of the proppant into the well completion can be controlled based on whether the characteristics of the proppant have changed and how the characteristics of the proppant have changed. For example, if an initial well completion plan is generated based on proppant characteristics that remain unchanged, then the initial well completion plan can be followed. In another example, a well completion plan can be identified based on changing proppant characteristics. Specifically, a well completion plan can be modified to account for changing proppant characteristics.

In controlling integration of the proppant based on the first entry and the second entry, blending of the proppant with one or more friction reducers can be controlled based on the first entry and the second entry. In particular, a specific type of friction reducer can be selected based on characteristics of the proppant included in the first entry and the second entry. As follows, the proppant can be blended with the selected friction reducer and integrated in the well completion. In another example, a ratio of friction reducer and proppant can be selected based on characteristics of the proppant included the first entry and the second entry. As follows, the proppant can be blended with the friction reducer and introduced in the well completion according to the determined ratio.

Figure 9:
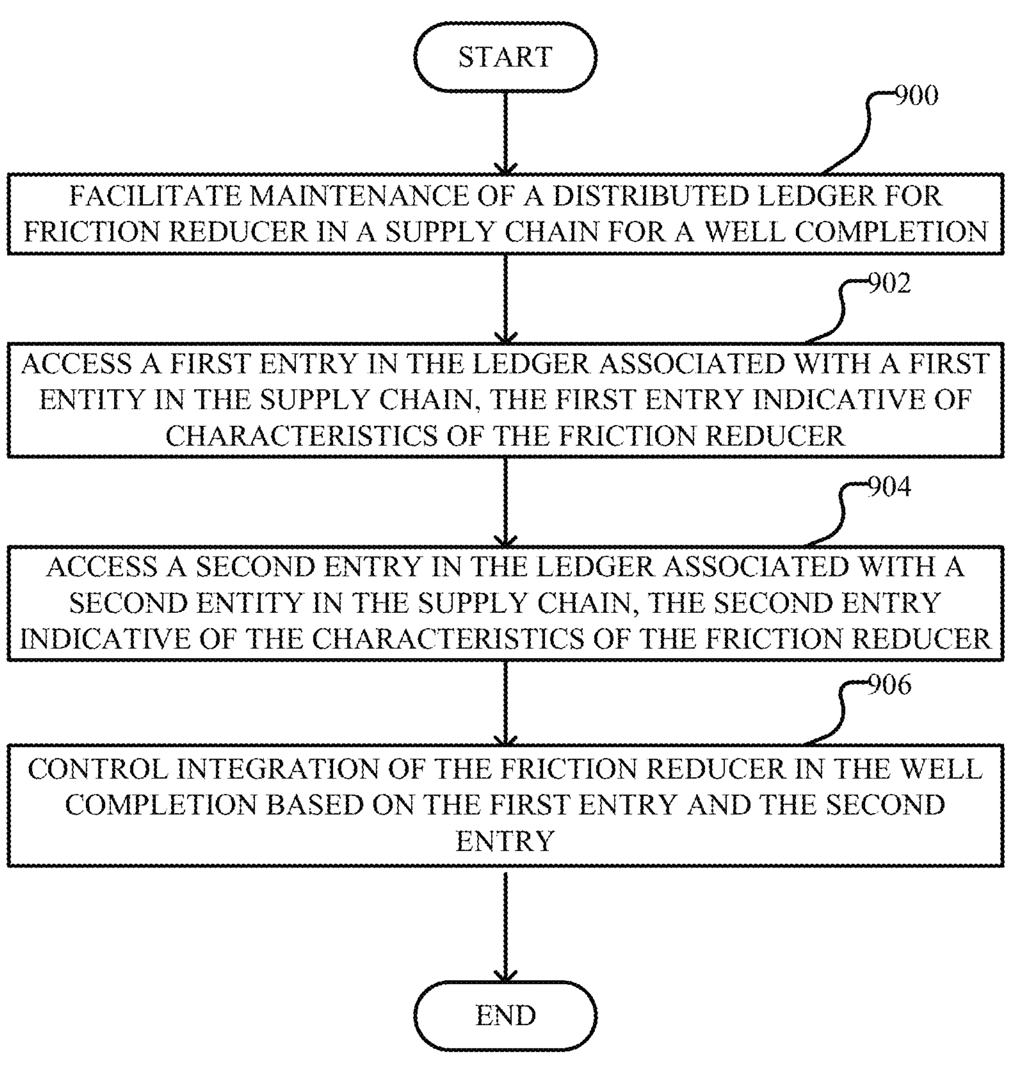
FIG. 9 illustrates a flowchart for an example method of controlling friction reducer integration into a well completion based on entries in a distributed ledger that tracks the friction reducer through a supply chain, in accordance with various aspects of the subject technology.

The disclosure now continues with a discussion of integrating a supply chain of friction reducer for a well completion into a distributed ledger. Specifically, FIG. 9 illustrates a flowchart for an example method of controlling friction reducer integration into a well completion based on entries in a distributed ledger that tracks the proppant through a supply chain. The method shown in FIG. 9 is provided by way of example, as there are a variety of ways to carry out the method. Additionally, while the example method is illustrated with a particular order of steps, those of ordinary skill in the art will appreciate that FIG. 9 and the modules shown therein can be executed in any order and can include fewer or more modules than illustrated. Each module shown in FIG. 9 represents one or more steps, processes, methods or routines in the method.

The following description describes an example friction reducer supply chain for a well completion. Friction reducers are chemical additives used in hydraulic fracturing fluids to reduce the friction between the fluid and the wellbore. This can allow for more efficient pumping at less energy for a desired injection rate. Chemical manufacturers can produce friction reducers through various processes, which may involve the synthesis or modification of polymers. A distributed ledger can be used in tracking data associated with production windows for frictions reducers, such as time, temperature, and raw component volumes.

First in the friction reducer supply chain, raw material are sourced. Specifically, friction reducers are produced using raw materials, such as monomers, base oils, surfactants, polymers, or other chemical compounds. Chemical manufacturers can source these raw materials from suppliers or produce them in-house. Raw material suppliers can include petroleum refiners, chemical manufacturers, or other specialized suppliers. A distributed ledger can be used to record that raw material quality is within expected ranges and that raw materials are from approved sources, e.g. based on previously qualified material.

Next formulation and packaging of the friction reducers occurs. Specifically, once the raw materials are obtained, chemical manufacturers formulate the friction reducers according to specific formulations and requirements, e.g. specifications. The frictions reducers can be blended with other ingredients and additives to achieve specific properties. After formulation, the chemicals can be packaged in containers such as drums, totes, or bulk tanks for distribution. Confirmation of shipping and receipt and material condition at each point in distribution can be recorded on a distributed ledger.

At a distribution stage, the friction reducers are distributed from manufacturers to well sites. During this stage inventory is managed, logistics for distribution are controlled, and coordination with well site participants occurs for ultimately moving the friction reducers to well sites. Information related to this distribution can be recorded on a distributed ledger.

At another stage, friction reducers are actually delivered to the well site using various transportation modes such as trucks and rail. The chemicals can be unloaded and stored in designated areas or tanks. The well site logistics team can ensure that frictions reducers are available at the well site when needed in performing the well completion.

At the well site, the friction reducers can be integrated into the well completion. Specifically, friction reducers can be mixed with water, sand, and other additives. The resulting hydraulic fracturing fluid can then be injected into the well under high pressure to fracture the rock formation and generate propped fractures.

Returning back to the flowchart shown in FIG. 9, at step 900, maintenance of a distributed ledger for friction reducer in a supply chain for a well completion is facilitated. In facilitating maintenance of a distributed ledger for friction reducer in a supply chain for a well completion, applicable systems and methods can be implemented in facilitating the maintenance of the distributed ledger. Specifically, contracts, e.g. smart contracts, can be entered into that requires inputting data that is relevant to the procurement and delivery of friction reducer to a well completion provider. For example, a contract can be entered into with an entity for transporting friction reducer that requires that the entity test the friction reducer upon receipt of the friction reducer and input data indicative of measured characteristics of the friction reducer to the distributed ledger. Further, auditors can be integrated into the supply chain to test the friction reducer at various points in the supply chain and input data indicative of measured characteristics of the friction reducer to the distributed ledger.

Facilitating maintenance of the distributed ledger for friction reducer in the supply chain can include setting up the systems for implementing the distributed ledger. Further, facilitating maintenance of the distributed ledger for friction reducer in the supply chain can include maintaining the systems for implementing the distributed ledger as friction reducer moves through the supply chain to a well completion provider. Further, facilitating maintenance of the distributed ledger can include controlling entity access to the distributed ledger.

At step 902, a first entry in the ledger associated with a first entity in the friction reducer supply chain is accessed. With respect to the first entry in the ledger, the first entity in the supply chain can be an entity for sourcing the friction reducer in the supply chain or an entity associated with the sourcing of the friction reducer in the supply chain. For example, the first entity can be manufacturer of a friction reducer. The first entry can be accessed by an applicable entity capable of accessing the distributed ledger for friction reducer in the supply chain. For example, the first entry can be accessed by a well completion provider who can use the friction reducer in a well completion.

The first entry includes information indicative of characteristics of the friction reducer. Characteristics of the friction reducer, as used herein, can include applicable characteristics of the friction reducer that can affect a well completion. For example, characteristics of the friction reducer can include a source of the friction reducer, characteristics of a composition of the friction reducer, and functional characteristics of the friction reducer in affecting rheological properties of a fluid. Characteristics of the friction reducer can also include characteristics of a dopant or a tracer that is added to the friction reducer for tracking the friction reducer through the supply chain. For example, a dye that is detectable under specific forms of electromagnetic radiation can be added to the friction reducer to track the friction reducer as it moves through the supply chain. A tracer can be added to the friction reducer at an applicable point in the supply chain. Specifically, the tracer can be added to the friction reducer after the friction reducer is generated by a supplier.

Characteristics of friction reducers can be determined through applicable techniques. Such tests can assess the effectiveness and efficiency of the friction reducers in reducing friction and improving fluid flow properties during the fracturing process.

An example characterization technique can include friction testing. Friction testing can include measuring the frictional pressure drop of friction factor of the fracturing fluid containing the friction reducer. This can be done using applicable equipment such as flow loops or rheometers. The friction test can compare the performance of the different friction reducers or different concentrations of the same friction reducer under controlled conditions. Friction testing can be combined with compatibility testing, as will be described in greater detail later, to ensure that a friction reducer can provide desired performance during a fracturing treatment.

Another characterization technique is rheology analysis. In rheology analysis, the rheological properties of a friction reducer are determined. Such properties can include viscosity at various shear rates, intrinsic viscosity, storage modulus and loss modulus. These properties can be used in determining the flow behavior of the friction reducer.

Yet another characterization technique includes compatibility testing. Through compatibility testing, the interaction between frictions reducers, water, and other additives, are analyzed. This testing can involve determining whether the performance of the friction reducer is adversely affected by other components in the fluid such as salt contents, surfactants, breakers, or biocides. It also can be used to determine potential incompatibilities that can arise during fluid mixing or pumping processes.

Another characterization technique includes field-scale performance evaluation. Field-scale performance evaluation includes conducting actual tests during the hydraulic fracturing process. Specifically, parameters such as pump pressures, flow rates, proppant transport, fracture propagation, and other applicable parameters of the hydraulic fracturing process can be monitored. In turn, this can be used in quantifying or otherwise measuring performance of a friction reducer that is used during the hydraulic fracturing process.

Characteristics of the friction reducer can be gathered through applicable sensors during applicable tests. For example, density and viscosity. Sensors can automatically acquire data indicative of characteristics of the friction reducer. As follows, this data can be automatically added to the distributed ledger. The data can be automatically added to the ledger according to specific rules for adding data to the ledger. The rules can include applicable rules that specify when data should be written to a distributed ledger associated with a friction reducer supply chain. For example, a rule can specify to write data to a ledger when a friction reducer is transferred from a manufacturer to a distributor. In another example, a rule can specify to write data regarding characteristics of friction reducers once the data describing the characteristics of the friction reducer have been verified.

Characteristics of the friction reducer can be identified automatically, e.g. by sensors in a flow path of the friction reducer. Further, characteristics of the friction reducer can be identified from samples of the friction reducer. The samples of friction reducer may be taken from time to time from (for example) a flow conduit or storage, for sensing and analysis separate from the chain of friction reducer conveyance. As follows, this data can be automatically added to the distributed ledger. Data can be automatically added to the ledger according to specific rules for adding data to the ledger. The rules can include applicable rules that specify when data should be written to a distributed ledger associated with a friction reducer supply chain. For example, a rule can specify to write data to a ledger when a friction reducer is received at a wellsite. In another example, a rule can specify to write data regarding characteristics of a friction reducer once the data describing the characteristics of the friction reducer is obtained. Data relating to such parameters may also be gathered in a manual process (e.g. by a person) rather than automated sensing process. This may be done in a periodic or routine manner, or in conduct of an audit. The resulting data from such manual process may be added to the ledger.

Including characteristics of the friction reducer on the distributed ledger allows for the tracking of the friction reducer and potentially changing characteristics of the friction reducer through the supply chain. This is important in performing well completions as friction reducer characteristics can have great impacts on a well completion. Specifically, using a provided friction reducer that fails to meet requested supplier specifications can lead to deficiencies in performing a well completion.

At step 904, a second entry in the ledger associated with a second entity in the supply chain is accessed. The second entity can be an applicable entity that is after the first entity in the supply chain. For example, the second entity can be an auditor at a well completion site that grades the friction reducer after the first entity supplies the friction reducer. As follows, the second entry can be made in the distributed ledger after the first entry is made in the distributed ledger.

The second entry, just like the first entry, also indicates the characteristics of the friction reducer. The characteristics of the friction reducer included in the second entry can be the same characteristics that are identified and included in the first entry. This can be because the characteristics can be measured again in association with the second entity and remain unchanged with respect to the characteristics that were measured in association with the first entity. For example, a friction reducer supplier can provide purported characteristics of a friction reducer, and an auditor can verify the characteristics for a well completion provider. Further, the characteristics of the friction reducer included in the second entry can be the same as the characteristics included in the first entry because the characteristics are not determined again in association with the second entity. For example, characteristics of the friction reducer can be determined at the source but not determined again after the friction reducer is transferred to a well completion provider.

The characteristics of the friction reducer included in the second entry can be different from the characteristics of the friction reducer included in the first entry. This can reflect changing characteristics of the friction reducer as it moves through the supply chain. This can also reflect inaccurate characterization of the friction reducer, e.g. as determined during movement of the proppant through the supply chain. These changing characteristics or inaccuracies can have detrimental effects during a well completion, especially when initial characterizations are relied on in performing the well completion. For example, a well completion provider can expect the friction reducer to have specific functional aspects based on a purported characterization by a friction reducer supplier. However, the actual functional aspects can be different, potentially necessitating changing either or both a completion plan and the friction reducer before it is integrated into the well completion.

At step 906, integration of the friction reducer in the well completion is controlled based on the first entry and the second entry. Specifically, the first entry and the second entry can be compared to determine whether the characteristics of the friction reducer have changed as the friction reducer moves through the supply chain. As follows, integration of the friction reducer into the well completion can be controlled based on whether the characteristics of the friction reducer have changed and how the characteristics of the friction reducer have changed. For example, if an initial well completion plan is generated based on friction reducer characteristics that remain unchanged, then the initial well completion plan can be followed. In another example, a well completion plan can be identified based on changing friction reducer characteristics. Specifically, a well completion plan can be modified to account for changing friction reducer characteristics.

In controlling integration of the friction reducer based on the first entry and the second entry, the friction reducer can be modified, e.g. to meet a desired specification for the well completion. Specifically, components can be added to the friction reducer to change the properties of the friction reducer. For example, sodium silicate can be added to a friction reducer to remove ions. For example, a stabilizing agent such as a di-block copolymer can be added to remediate density and viscosity gradients within a container. As follows, the modified friction reducer can then be integrated into the well completion.

While the disclosure has described implementing a friction reducer supply chain, a water supply chain, and a proppant supply chain on distributed ledger(s), the technology described herein can be implemented for any applicable material used in a well completion that can be tracked through a distributed ledger.

The technology described herein can be implemented according to a value attributed model in relation to a wellbore completion. An example value attribution model may include an objective function of the generalized form:

$$Z=Ax+By \quad \text{Equation 1}$$

In Equation 1, Z is productivity or other value objective to be maximized for a participant in the value chain. The value objective can be a normalized value for a particular set of standard or benchmark circumstances e.g. for the well or the product or service to be provided for the well. For example, Z might be a well related outcome, such as a net present value ("NPV") of production volumes (volume metrics, or dollars e.g. at a benchmark price per barrel), or a parameter relating to the volume of rock which has been stimulated, or which has had new fractures established, or has a certain degree of flow conductivity established, or a or number of frack stages or clusters to a certain minimum standard of rock fracturing and/or flow enabled. Certain well related outcomes might be estimated in various methods of service providers (and that may be agreed by participants in a blockchain as a standard methodology), and include measurement of pressure signals at surface and/or downhole during or following hydraulic fracturing operations, and/or measurements of pressure or acoustics (e.g. distributed acoustic sensing or "DAS") using optical fiber or other sensors installed in the well being fractured, adjacent wells, and or by surface sensors. Certain methods may include an analysis step which may be physics and/or empirically derived, to convert the raw pressure, temperatures, DAS, or other data into such rock stimulation or fracture or flow conductivity values for the well. Z might be a well related efficiency outcome, the aforesaid well production metrics divided by critical inputs to achieving such production, e.g. diesel/gas/energy content of fuel, or hydraulic horsepower, or days on location, or water and other consumables required, or other metric relating to the pumping operations, or combinations of such process inputs or cost factors. In such an objective function, incremental value (positive or negative) is recognized when Z exceeds (or falls below) a benchmark value, or an average, which may itself be specific to or normalized for a region (e.g. the Permian Basin) or sub-region, or a set particular circumstances and/or parameters (e.g. true vertical depth or measured depth of wells, particular geologies, etc) which distinguish and segment such wells or operations from one another.

In an example objective function, X and Y may be the variable contributions which may vary for any particular well, and result in or contribute to the outcome Z. A and B are coefficients which may be estimated by physics or empirically. If Z is total production or stimulated rock for a well, X might be hydraulic fracturing pump HHP-Hours (with an appropriate coefficient A to address units and to recognize the relative importance of pump output), and Y might be a total volume of quality proppant placed in the well or per cluster (again with the appropriate coefficient B). The outcome Z, as well as the input variables X and Y, may be recorded in the ledger.

Each of X and Y may themselves have objective functions, with contributions from the next tier providers, for example in a form X=Cv+Dw, where X now becomes an objective function of a pressure pumping service company, related e.g. to the HHP delivered or able to be delivered for a well or a stage, and V and W the variable inputs which are at least partially in the control of one or more providers separate from the pressure pumpers, e.g. proppant providers. In one example, V may be a variable relating to weight or volume of proppant nominally meeting the proppant specifications (e.g. particular source, grain size distribution, etc) and being timely available at that well, and W might the count of individual instances of proppant being determined by sensors or service personnel as outside of specification (e.g. containing pebbles/rocks, potentially damaging to pump). The coefficients D may therefore be a negative number, to reflect the detrimental impact of certain variables. There may be other variables which contribute to objective X of the pressure pumping company, e.g. the number of pumps and personnel on-site. These additional variables may be important to the operation, but are fully in the control of the pumping company participant. For completeness they too may be included in the objective function, but this might be unnecessary for purposes of the allocating value to the next tier providers. The outcome X, as well as the variables V and W, may be recorded to the ledger.

In another example, the technology described herein can be implemented with respect to an objective function for erosion measurement in equipment and pipelines used in a well completion. Specifically, an erosion ratio ER can be modeled as a function particle shape factor, hardness of a target material, and impinging angle. The ER can be expressed according to the Equation 2 as the ratio of mass loss of material to mass of impacting particle, C and n are constants, V is the particle velocity, $F_s$ is the particle shape factor. $F_s$ can be an applicable value based on a shape of the particles. BH is the Brinnel harness of the target material. $F(\theta)$ is the angle function.

$$ER\left(\frac{\text{kg}}{\text{kg}}\right) = Fs.C.(BH)^{-0.59}.V^n.F(\theta) \qquad \text{Equation 2}$$

By applying an objective function for erosions measurement, erosion can be limited during a well completion. Specifically, characteristics of the raw materials used in the well completion can be monitored through a distributed ledger to meet specific erosion measurements modeled through the objective function. This is advantageous as erosion can cause leakage, pipeline failure, and equipment damage, thereby leading to increase well completion times and lost production time.

Figure 10:
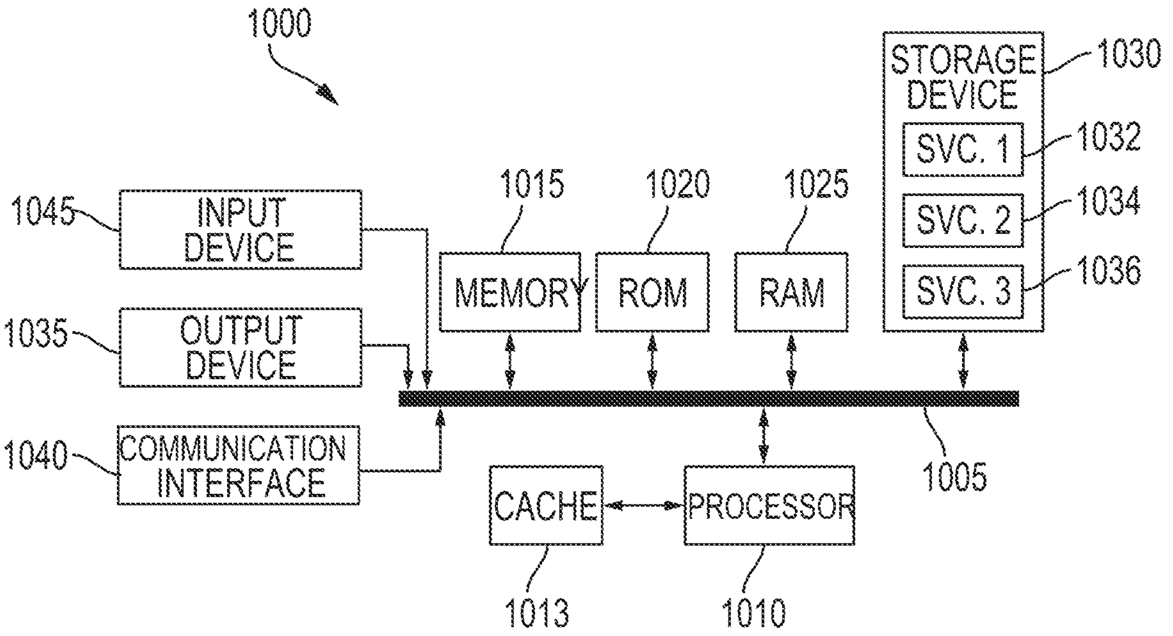
FIG. 10 is a schematic diagram of an example computing device architecture, in accordance with various aspects of the subject technology.

Having disclosed example systems, methods, and technologies for using a real-time predictive analysis to improve monitoring of drilling operations, the disclosure now turns to FIG. 10, which illustrates an example computing device architecture 1000 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 10 illustrates an example computing device architecture 1000 of a computing device which can implement the various technologies and techniques described herein. For example, the computing device architecture 1000 can implement the above-mentioned systems and perform various steps, methods, and techniques disclosed herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising: accessing a distributed ledger associated with a supply chain for a well completion, wherein the distributed ledger comprises: a first entry associated with a first entity in the supply chain that is indicative of an identification of the first entity and characteristics of a material implemented in the well completion; a second entry associated with a second entity in the supply chain that is indicative of the second entity and the characteristics of the material at the second entity; controlling integration of the material in the well completion based on the first entry and the second entry.

Statement 2. The method of statement 1, wherein the first entry is written into the distributed ledger in response to possession of the material by the first entity within the supply chain for the well completion and the second entry is written into the distributed ledger in response to possession of the material by the second entity within the supply chain for the well completion.

Statement 3. The method of statement 1 or 2, wherein the characteristics of the material included in the first entry are determined, at least in part, by the first entity.

Statement 4. The method of any of statements 1 through 3, wherein the characteristics of the material included in the first entry are determined, at least in part, by the first entity.

Statement 5. The method of any of statements 1 through 4, wherein the material is water and the characteristics of the material comprise conductivity of the water, pH of the water, density of the water, oxidation-reduction potential of the water, total dissolved oxygen content of the water, TDS (total dissolved solids) of the water, ion composition of the water, a source of the water, whether the water is potable, characteristics of a tracer, or a combination thereof.

Statement 6. The method of statement 5, wherein controlling integration of the material in the well completion based on the first entry and the second entry further comprises pretreating the water based on the characteristics of the material indicated in the first entry and the second entry.

Statement 7. The method of statements 5 or 6, further comprising: determining the characteristics of the water at a site of the well completion; comparing the characteristics of the water determined at the well completion site with the characteristics of the material included in the first entry and the second entry in the distributed ledger; and controlling integration of the water in the well completion at the well completion site based on the comparison as part of controlling integration of the material in the well based on the first entry and the second entry further comprises.

Statement 8. The method of any of statements 5 through 7, wherein the water is included in a first volume of water and controlling integration of the material in the well completion based on the first entry and the second entry further comprises mixing the first volume of water with a second volume of water based on the characteristics of the water.

Statement 9. The method of any of statements 1 through 4, wherein the material is a proppant and the characteristics of the material comprise an indication of a source of the proppant, an indication of a size of the proppant, a composition of the proppant, a grain size distribution of the proppant, dimensional measurements of grains of the proppant, roundness measurements of the grains of the proppant, or a combination thereof.

Statement 10. The method of statement 9, wherein the characteristics of the material include identifiable characteristics of a tracer that is added to the proppant to track the proppant as it moves through the supply chain.

Statement 11. The method of statement 9 or 10, wherein the characteristics of the material are determined through a camera, a sensor, a laser, or a combination thereof.

Statement 12. The method of any of statements 9 through 11, wherein controlling integration of the material in the well completion based on the first entry and the second entry further comprises controlling blending of the proppant with a friction reducer.

Statement 13. The method of any of statements 1 through 4, wherein the material is a friction reducer and the characteristics of the material comprise a source of the friction reducer, characteristics of a composition of the friction reducer, functional characteristics of the friction reducer in affecting rheological properties of a fluid, or a combination thereof.

Statement 14. The method of statement 13, wherein the characteristics of the material include identifiable characteristics of a tracer that is added to the friction reducer to track the friction reducer as it moves through the supply chain.

Statement 15. The method of statements 13 or 14, controlling integration of the material in the well completion based on the first entry and the second entry further comprises mixing the friction reducer with one or more additives.

Statement 16. A system comprising, one or more processors; and at least one computer-readable storage medium having stored therein instructions which, when executed by the one or more processors, cause the one or more processors to: access a distributed ledger associated with a supply chain for a well completion, wherein the distributed ledger comprises: a first entry associated with a first entity in the supply chain that is indicative of an identification of the first entity and characteristics of a material implemented in the well completion; a second entry associated with a second entity in the supply chain that is indicative of the second entity and the characteristics of the material at the second entity; control integration of the material in the well completion based on the first entry and the second entry.

Statement 17. The system of statement 16, wherein the material is water and the characteristics of the material comprise conductivity of the water, pH of the water, density of the water, oxidation-reduction potential of the water, total dissolved oxygen content of the water, TDS (total dissolved solids) of the water, ion composition of the water a source of the water, whether the water is potable, characteristics of a tracer, or a combination thereof.

Statement 18. The system of statement 16, wherein the material is a proppant and the characteristics of the material comprise an indication of a source of the proppant, an indication of a size of the proppant, a composition of the proppant, a grain size distribution of the proppant, dimensional measurements of grains of the proppant, roundness measurements of the grains of the proppant, or a combination thereof.

Statement 19. The system of statement 16, wherein the material is a friction reducer and the characteristics of the material comprise a source of the friction reducer, characteristics of a composition of the friction reducer, functional characteristics of the friction reducer in affecting rheological properties of a fluid, or a combination thereof.

Statement 20. A non-transitory computer-readable storage medium storing instructions for causing one or more processors to: access a distributed ledger associated with a supply chain for a well completion, wherein the distributed ledger comprises: a first entry associated with a first entity in the supply chain that is indicative of an identification of the first entity and characteristics of a material implemented in the well completion; a second entry associated with a second entity in the supply chain that is indicative of the second entity and the characteristics of the material at the second entity; control integration of the material in the well completion based on the first entry and the second entry.

Statement 21. A system comprising means for performing a method according to any of statements 1 through 15.

What is claimed is:

1. A method comprising:

accessing a distributed ledger associated with a supply chain for a well completion, wherein the distributed ledger comprises:

a first entry associated with a first entity in the supply chain that is indicative of an identification of the first entity and characteristics of a material at the first entity, wherein the material is implemented in the well completion and is supplied through the supply chain associated with the distributed ledger;

a second entry associated with a second entity in the supply chain that is indicative of the second entity and the characteristics of the material at the second entity;

determining the characteristics of the material at a site of the well completion;

comparing the characteristics of the material determined at the well completion site with the characteristics of the material included in the first entry and the second entry in the distributed ledger; and controlling integration of the material in the well completion based on the comparison of the characteristics of the material determined at the well completion site and the characteristics of the material included in the first entry and the second entry in the distributed ledger.

2. The method of claim 1, wherein the first entry is written into the distributed ledger in response to possession of the material by the first entity within the supply chain for the well completion and the second entry is written into the distributed ledger in response to possession of the material by the second entity within the supply chain for the well completion.

3. The method of claim 1, wherein the characteristics of the material included in the first entry are determined, at least in part, by the first entity.

4. The method of claim 3, wherein the material is directly transferred between the first entry and the second entry within the supply chain and the characteristics of the material included in the second entry are determined, at least in part, by the first entity.

5. The method of claim 1, wherein the material is water and the characteristics of the material comprise conductivity of the water, pH of the water, density of the water, oxidation-reduction potential of the water, total dissolved oxygen content of the water, TDS (total dissolved solids) of the water, ion composition of the water, a source of the water, whether the water is potable, characteristics of a tracer, or a combination thereof.

6. The method of claim 5, wherein controlling integration of the material in the well completion based on the first entry and the second entry further comprises pretreating the water based on the characteristics of the material indicated in the first entry and the second entry.

7. The method of claim 5, further comprising:

determining the characteristics of the water at a site of the well completion;

comparing the characteristics of the water determined at the well completion site with the characteristics of the material included in the first entry and the second entry in the distributed ledger; and controlling integration of the water in the well completion at the well completion site based on the comparison as part of controlling integration of the material in the well based on the first entry and the second entry further comprises.

8. The method of claim 5, wherein the water is included in a first volume of water and controlling integration of the material in the well completion based on the first entry and the second entry further comprises mixing the first volume of water with a second volume of water based on the characteristics of the water.

9. The method of claim 1, wherein the material is a proppant and the characteristics of the material comprise an indication of a source of the proppant, an indication of a size of the proppant, a composition of the proppant, a grain size distribution of the proppant, dimensional measurements of grains of the proppant, roundness measurements of the grains of the proppant, an amount of flow that the proppant will allow, an acid solubility of the proppant, a crush resistance of the proppant, a solubility of the proppant, a turbidity of the proppant, or a combination thereof.

10. The method of claim 9, wherein the characteristics of the material include identifiable characteristics of a tracer that is added to the proppant to track the proppant as it moves through the supply chain.

11. The method of claim 9, wherein the characteristics of the material are determined through a camera, a sensor, a laser, or a combination thereof.

12. The method of claim 9, wherein controlling integration of the material in the well completion based on the first entry and the second entry further comprises controlling blending of the proppant with a friction reducer.

13. The method of claim 1, wherein the material is a friction reducer and the characteristics of the material comprise a source of the friction reducer, characteristics of a composition of the friction reducer, functional characteristics of the friction reducer in affecting rheological properties of a fluid, or a combination thereof.

14. The method of claim 13, wherein the characteristics of the material include identifiable characteristics of a tracer that is added to the friction reducer to track the friction reducer as it moves through the supply chain.

15. The method of claim 13, controlling integration of the material in the well completion based on the first entry and the second entry further comprises mixing the friction reducer with one or more additives.

16. A system comprising:

one or more processors; and at least one computer-readable storage medium having stored therein instructions which, when executed by the one or more processors, cause the one or more processors to:

access a distributed ledger associated with a supply chain for a well completion, wherein the distributed ledger comprises:

a first entry associated with a first entity in the supply chain that is indicative of an identification of the first entity and characteristics of a material at the first entity, wherein the material is implemented in the well completion and is supplied through the supply chain associated with the distributed ledger;

a second entry associated with a second entity in the supply chain that is indicative of the second entity and the characteristics of the material at the second entity; and determine the characteristics of the material at a site of the well completion;

compare the characteristics of the material determined at the well completion site with the characteristics of the material included in the first entry and the second entry in the distributed ledger; and control integration of the material in the well completion based on the comparison of the characteristics of the material determined at the well completion site and the characteristics of the material included in the first entry and the second entry in the distributed ledger.

17. The system of claim 16, wherein the material is water and the characteristics of the material comprise conductivity of the water, pH of the water, density of the water, oxidation-reduction potential of the water, total dissolved oxygen content of the water, TDS (total dissolved solids) of the water, ion composition of the water a source of the water, whether the water is potable, characteristics of a tracer, or a combination thereof.

18. The system of claim 16, wherein the material is a proppant and the characteristics of the material comprise an indication of a source of the proppant, an indication of a size of the proppant, a composition of the proppant, a grain size distribution of the proppant, dimensional measurements of grains of the proppant, roundness measurements of the grains of the proppant, or a combination thereof.

19. The system of claim 16, wherein the material is a friction reducer and the characteristics of the material comprise a source of the friction reducer, characteristics of a composition of the friction reducer, functional characteristics of the friction reducer in affecting rheological properties of a fluid, or a combination thereof.

20. A non-transitory computer-readable storage medium storing instructions for causing one or more processors to:

access a distributed ledger associated with a supply chain for a well completion, wherein the distributed ledger comprises:

a first entry associated with a first entity in the supply chain that is indicative of an identification of the first entity and characteristics of a material at the first entity, wherein the material is implemented in the well completion and is supplied through the supply chain associated with the distributed ledger;

a second entry associated with a second entity in the supply chain that is indicative of the second entity and the characteristics of the material at the second entity;

determine the characteristics of the material at a site of the well completion;

compare the characteristics of the material determined at the well completion site with the characteristics of the material included in the first entry and the second entry in the distributed ledger; and control integration of the material in the well completion based on the comparison of the characteristics of the material determined at the well completion site and the characteristics of the material included in the first entry and the second entry in the distributed ledger.

21. A method comprising:

sensing, at a location of a first entity, a first parameter value indicative of a characteristic of a material that is in a supply chain for a well completion;

inputting to a distributed ledger associated with the supply chain, the first parameter value with information indicative of at least one of the first entity's (i) identity and (ii) location;

sensing, at a location of a second entity, a second parameter value indicative of a characteristic of a material that is in the supply chain for the well completion;

inputting to the distributed ledger the second parameter value with information indicative of at least one of the second entity's (i) identity and (ii) location;

determining the characteristic of the material at a site of the well completion;

comparing the characteristic of the material determined at the well completion site with the characteristic of the material in the distributed ledger; and determining, in relation to an objective for the well completion, a contribution made to the objective of each of the first entity and the second entity dependent at least in part on the first and second parameters' value based on the comparison of the characteristic of the material determined at the well completion site and the characteristic of the material included in the distributed ledger.

* * * * *